(12) United States Patent
Johnson et al.

(10) Patent No.: US 8,144,612 B2
(45) Date of Patent: Mar. 27, 2012

(54) SYSTEMS AND METHODS FOR TRANSMITTING MEDIA CONTENT VIA DIGITAL RADIO BROADCAST TRANSMISSION FOR SYNCHRONIZED RENDERING BY A RECEIVER

(75) Inventors: Steven Andrew Johnson, Ellicott City, MD (US); Muthu Gopal Balasubramanian, Ellicott City, MD (US); Harvey Chalmers, Rockville, MD (US); Albert John Gambardella, Port Monmouth, NJ (US); Russell Iannuzzelli, Bethesda, MD (US); Stephen Douglas Mattson, Felton, PA (US)

(73) Assignee: iBiquity Digital Corporation, Columbia, MD (US)

( * ) Notice: Subject to any disclaimer, the term of this patent is extended or adjusted under 35 U.S.C. 154(b) by 452 days.

(21) Appl. No.: 12/385,660

(22) Filed: Apr. 15, 2009

(65) Prior Publication Data

US 2010/0265398 A1    Oct. 21, 2010

(51) Int. Cl.
 *H04L 12/56*  (2006.01)
 *H04J 3/06*   (2006.01)
 *H04N 7/12*   (2006.01)
(52) U.S. Cl. .............. 370/252; 370/503; 348/423.1; 348/425.4
(58) Field of Classification Search .............. None
See application file for complete search history.

(56) References Cited

U.S. PATENT DOCUMENTS

| 5,790,784 | A   |   | 8/1998  | Beale et al. |
| 6,807,191 | B2  | * | 10/2004 | Fujii et al. ............. 370/464 |
| 7,305,043 | B2  |   | 12/2007 | Milbar et al. |
| 7,512,175 | B2  |   | 3/2009  | Kroeger |
| 7,991,801 | B2  | * | 8/2011  | Chen et al. ............. 707/803 |
| 2002/0067744 | A1 | * | 6/2002 | Fujii et al. ............. 370/535 |
| 2002/0103919 | A1 | * | 8/2002 | Hannaway ............. 709/231 |
| 2003/0223387 | A1 |   | 12/2003 | Davenport et al. |
| 2004/0226050 | A1 |   | 11/2004 | Matsuzaki et al. |
| 2007/0136777 | A1 | * | 6/2007 | Hasek et al. ............. 725/114 |
| 2008/0125030 | A1 |   | 5/2008  | Mantel et al. |
| 2008/0152039 | A1 |   | 6/2008  | Shah et al. |
| 2008/0249986 | A1 |   | 10/2008 | Clarke-Martin et al. |
| 2009/0061763 | A1 |   | 3/2009  | Dillon et al. |

OTHER PUBLICATIONS

Hewlett Packard, "MPEG 2: The Basics of How It Works", Date Unknown, pp. 1-17, "http://www.medialab.ch/dm/vorlesung/".
National Association of Broadcasters—National Radio Systems Committee, "NRSC-5-A In-band/on-channel Digital Radio Broadcasting Standard", Sep. 2005, pp. 1-36, "http://www.nrscstandards.org."

(Continued)

*Primary Examiner* — Steven H Nguyen
(74) *Attorney, Agent, or Firm* — Jones Day

(57) ABSTRACT

Systems, methods, and processor readable media are disclosed for encoding and transmitting first media content and second media content using a digital radio broadcast system, such that the second media content can be rendered in synchronization with the first media content by a digital radio broadcast receiver. The disclosed systems, methods, and processor-readable media determine when a receiver will render audio and data content that is transmitted at a given time by the digital radio broadcast transmitter, and adjust the media content accordingly to provide synchronized rendering. In exemplary embodiments, these adjustments can be provided by: 1) inserting timing instructions specifying playback time in the secondary content based on calculated delays; or 2) controlling the timing of sending the primary or secondary content to the transmitter so that it will be rendered in synchronization by the receiver.

66 Claims, 19 Drawing Sheets

OTHER PUBLICATIONS

Martin Nilsson, "ID3 tag version 2.3.0", Feb. 3, 1999, pp. 1-45, "http://www.id3.org".

European Telecommunications Standards Institute, "Digital Audio Broadcast (DAB); Multimedia Object Transfer (MOT) protocol—ETSI EN 301 234 v2.1.1," Feb. 2005, pp. 1-76.

European Telecommunications Standards Institute, "Digital Audio Broadcast (DAB); Transportation and Binary Encoding Specification for DAB Electronic Programme Guide (EPG)—ETSI TS 102 371 v.1.1.1," Jan. 2005, pp. 1-37.

W3C, "Synchronized Multimedia Integration Language (SMIL 3.0)," Dec. 1, 2008, pp. 83-222, "http://www.w3.org/TR/2008/REC-SMIL3-20081201/smil30.html".

International Search Report for PCT/US2010/030821 dated Jun. 15, 2010.

* cited by examiner

SYSTEMS AND METHODS FOR TRANSMITTING MEDIA CONTENT VIA DIGITAL RADIO BROADCAST TRANSMISSION FOR SYNCHRONIZED RENDERING BY A RECEIVER

BACKGROUND

1. Field of the Disclosure

The present disclosure relates to digital radio broadcast transmission and reception of media content for synchronized rendering at a digital radio broadcast receiver.

2. Background Information

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC digital radio broadcasting signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC digital radio broadcasting technology can provide digital quality audio, superior to existing analog broadcasting formats. Because each IBOC digital radio broadcasting signal is transmitted within the spectral mask of an existing AM or FM channel allocation, it requires no new spectral allocations. IBOC digital radio broadcasting promotes economy of spectrum while enabling broadcasters to supply digital quality audio to the present base of listeners.

Multicasting, the ability to deliver several audio programs or services over one channel in the AM or FM spectrum, enables stations to broadcast multiple services and supplemental programs on any of the sub-channels of the main frequency. For example, multiple data services can include alternative music formats, local traffic, weather, news, and sports. The supplemental services and programs can be accessed in the same manner as the traditional station frequency using tuning or seeking functions. For example, if the analog modulated signal is centered at 94.1 MHz, the same broadcast in IBOC can include supplemental services 94.1-2, and 94.1-3. Highly specialized supplemental programming can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5, in September 2005. NRSC-5 and its updates, the disclosure of which are incorporated herein by reference, set forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/SG.asp. iBiquity's HD Radio technology is an implementation of the NRSC-5 IBOC standard. Further information regarding HD Radio technology can be found at www.hdradio.com and www.ibiquity.com.

Other types of digital radio broadcasting systems include satellite systems such as Satellite Digital Audio Radio Service (SDARS, e.g., XM Radio, Sirius), Digital Audio Radio Service (DARS, e.g., WorldSpace), and terrestrial systems such as Digital Radio Mondiale (DRM), Eureka 147 (branded as DAB Digital Audio Broadcasting), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

As described above, one advantage of digital radio broadcasting systems is that they provide the capability to transmit multiple services, including audio and data, over one AM or FM frequency. For certain applications, such as displaying album art, image slide shows, scrolling text information, closed captioning, and product purchase information, it may be desirable to synchronize the content contained in one service with content contained in another service or to synchronize subservices or components of the same service.

Conventional techniques known to the inventors for transmitting content for synchronized rendering by a receiver place responsibility and processing requirements for synchronization on the receiver. For example, the MPEG Transport System, which can be used to transmit synchronized video content and audio content to be synchronized, includes a Program Clock Reference (PCR) 27 MHz clock signal in the Transport Stream for synchronization of the video and audio. Each video packet and audio packet separately includes a Decode and Presentation Time Stamp referenced to the PCR that permit the receiver to determine when the packet should be decoded and rendered. As another example, Synchronized Media Integration Language v. 3.0 (SMIL) requires the receiver to know the state of rendering primary content (e.g., how long an audio track has been playing) and provides attributes that may specify a begin time to render secondary content (e.g., album art) based on the rendering of primary content, thus permitting the receiver to decode that information to provide proper synchronization. As another example, SMIL also provides attributes that may specify a begin time to render secondary content at a predetermined universal coordinated time (UTC) regardless of the state of rendering the primary content.

However, the present inventors have found that none of these techniques is entirely satisfactory for synchronizing content in the currently deployed HD Radio broadcast system. This system includes multiple and varying signal processing paths on both the transmit and the receive side that must be accounted for when synchronizing services or subservices. In addition, Digital radio broadcast receivers typically include a baseband processor that decodes the audio content and the data content and outputs audio to speakers. The data is then directed to a host controller that processes and renders the data as media content. However, the host controller typically has no knowledge of the audio samples, including the state of playback, since the audio is sent directly from the baseband processor to the speakers. The present inventors have determined that conventional synchronization approaches are not helpful for such receiver configurations and use of conventional approaches would require undesirable modifications at the receiver side.

SUMMARY

Embodiments of the present disclosure are directed to systems and methods that may satisfy these needs. According to exemplary embodiments, a computer-implemented method of encoding and transmitting first media content and second media content using a digital radio broadcast system comprising a processing system, such that the second media content can be rendered in synchronization with the first media content by a digital radio broadcast receiver is disclosed. The method comprises the steps of determining at the processing system a first value corresponding to a time at which a frame is to be transmitted by a digital radio broadcast transmitter; determining at the processing system a second value corresponding to a time at which first media content transmitted in the frame is to be rendered by a digital radio broadcast receiver based on a first latency, wherein the first latency is based on an estimated time for processing the first media content via a first signal path through the digital radio broadcast transmitter and the digital radio broadcast receiver; determining at the processing system a third value corresponding to a time at which second media content in the frame would be rendered by the digital radio broadcast receiver based on a second latency, wherein the second latency is based on an estimated time for processing the first media content via a second signal path through the digital radio broadcast transmitter and the digital radio broadcast receiver, and wherein the second latency that is different than the first latency; processing the second media content at the processing system based on the first, second, and third values to determine a time at which second media content is to be transmitted to the digital radio broadcast receiver, so as to synchronize the timing of rendering the second media content at a digital radio broadcast receiver relative to the timing of rendering the first media content at the digital radio broadcast receiver; and communicating to the digital radio broadcast transmitter, the first value, first media content, second media content, and data control instructions associating the second media content with the first media content.

According to further exemplary embodiments, a computer-implemented method of encoding and transmitting first media content and second media content using a digital radio broadcast system comprising a processing system, such that the second media content can be rendered in synchronization with the first media content by a digital radio broadcast receiver is disclosed. The method comprises the steps of determining at the processing system a first value corresponding to a time at which a frame is to be transmitted by a digital radio broadcast transmitter; determining at the processing system a second value corresponding to a time at which first media content transmitted in the frame is to be rendered by a digital radio broadcast receiver based on a first latency, wherein the first latency is based on an estimated time for processing the first media content via a first signal path through the digital radio broadcast transmitter and the digital radio broadcast receiver; determining at the processing system a third value corresponding to a time at which second media content in the frame would be rendered by the digital radio broadcast receiver based on a second latency, wherein the second latency is based on an estimated time for processing the first media content via a second signal path through the digital radio broadcast transmitter and the digital radio broadcast receiver, and wherein the second latency that is different than the first latency; communicating the first, second, and third values to a client; receiving second media content for the frame from the client at a time determined by the client based on the first, second, and third values, thereby controlling the timing at which second media content is to be transmitted by the digital radio broadcast transmitter, so as to synchronize the timing of rendering the second media content at a digital radio broadcast receiver relative to the timing of rendering the first media content at the digital radio broadcast receiver; and communicating to the digital radio broadcast transmitter the first value, first media content, second media content, and data control instructions associating the second media content with the first media content.

According to further exemplary embodiments, a computer-implemented method of encoding and transmitting first media content and second media content using a digital radio broadcast system comprising a processing system, such that the second media content can be rendered in synchronization with the first media content by a digital radio broadcast receiver is disclosed. The method comprises the steps of determining at the processing system a first value corresponding to a time at which a first frame is to be transmitted by a digital radio broadcast transmitter; determining at the processing system a second value corresponding to a time at which first media content transmitted in the first frame is to be rendered by a digital radio broadcast receiver; communicating the first and second values to a client; receiving from the client second media content and timing instructions for the digital radio broadcast receiver to render the second media content at a predetermined time in synchronization with the first media content based on the first and second values; communicating a second frame to the digital radio broadcast transmitter, wherein the second frame includes the second media content, the timing instructions, and data control instructions associating the first media content with the second media content; and communicating the first frame including the first media content and the first value to the digital radio broadcast transmitter such that the first media content and the second media content are rendered in synchronization by the digital radio broadcast receiver.

According to still further exemplary embodiments, a computer-implemented method of receiving and rendering first media content in synchronization with second media content in a digital radio broadcast receiver is disclosed. The method comprises the steps of receiving a frame having first media content, second media content, and data control instructions associating the first media content with the second media content, wherein the second media content has been composed for rendering in synchronization with the first media content based on an estimated latency through a digital radio broadcast transmitter and a digital radio broadcast receiver; processing the first media content through a first signal path in the digital radio broadcast receiver, thereby incurring a first latency; processing the second media content through a second signal path in the digital radio broadcast receiver, thereby incurring a second latency that is different than the first latency; associating the second media content with the first media content based on the data control instructions; and rendering the second media content in synchronization with the first media content, wherein the digital radio broadcast receiver renders the first media content and the second media content without making determinations about the relative rendering timing for the second media content and the first media content.

A system comprising a processing system and a memory coupled to the processing system is described wherein the processing system is configured to carry out the above-described method. Computer programming instructions adapted to cause a processing system to carry out the above-described method may be embodied within any suitable article of manufacture such as a computer readable storage medium.

BRIEF DESCRIPTION OF THE DRAWINGS

These and other features, aspects, and advantages of the present disclosure will become better understood with regard to the following description, appended claims, and accompanying drawings wherein:

DESCRIPTION

Figure 1:
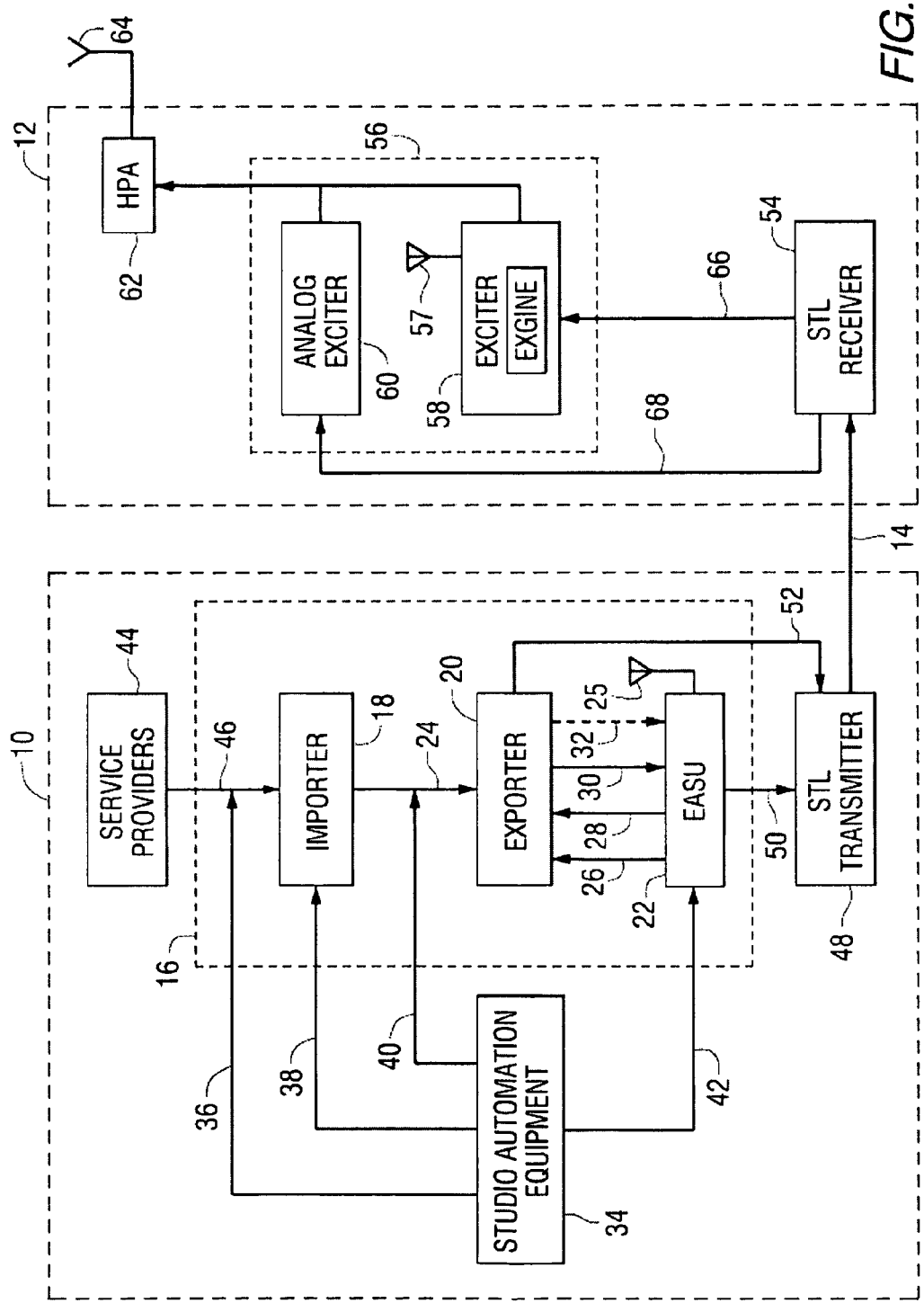
FIG. 1 illustrates a block diagram that provides an overview of a system in accordance with certain embodiments.

Digital radio broadcast systems as described herein can transmit media content for synchronized rendering at a digital radio broadcast receiver. To overcome the receiver intensive processing required for conventional synchronization techniques, the present inventors have developed novel processing of media content at the transmitter side so that different media content can be rendered in synchronization at the receiver.

Exemplary Digital Radio Broadcasting System

FIGS. 1-10 and the accompanying description herein provide a general description of an exemplary IBOC system, exemplary broadcasting equipment structure and operation, and exemplary receiver structure and operation. FIGS. 11-18 and the accompanying description herein provide a detailed description of exemplary approaches for transmitting media content for synchronized rendering in a digital radio broadcast system in accordance with exemplary embodiments of the present disclosure. Whereas aspects of the disclosure are presented in the context of an exemplary IBOC system, it should be understood that the present disclosure is not limited to IBOC systems and that the teachings herein are applicable to other forms of digital radio broadcasting as well.

As referred to herein, a service is any analog or digital medium for communicating content via radio frequency broadcast. For example, in an IBOC radio signal, the analog modulated signal, the digital main program service, and the digital supplemental program services could all be considered services. Other examples of services can include conditionally accessed programs (CAs), which are programs that require a specific access code and can be both audio and/or data such as, for example, a broadcast of a game, concert, or traffic update service, and data services, such as traffic data, multimedia and other files, and service information guides (SIGs).

Additionally, as referred to herein, media content is any substantive information or creative material, including, for example, audio, video, text, image, or metadata, that is suitable for processing by a processing system to be rendered, displayed, played back, and/or used by a human.

Furthermore, one of ordinary skill in the art would appreciate that what amounts to synchronization can depend on the particular implementation. As a general matter, two pieces of content are synchronized if they make sense in temporal relation to one another when rendered to a listener. For example, album art may be considered synchronized with associated audio if the onset of the images either leads or follows the onset of the audio by 3 seconds or less. For a karaoke implementation, for example, a word of karaoke text should not follow its associated time for singing that word but can be synchronized if it precedes the time for singing the word by as much as a few seconds (e.g., 1 to 3 seconds). In other embodiments, content may be deemed synchronized if it is rendered, for example, within about +/−3 seconds of associated audio, or within about +/−one-tenth of a second of associated audio.

Referring to the drawings, FIG. 1 is a functional block diagram of exemplary relevant components of a studio site 10, an FM transmitter site 12, and a studio transmitter link (STL) 14 that can be used to broadcast an FM IBOC digital radio broadcasting signal. The studio site includes, among other things, studio automation equipment 34, an Ensemble Operations Center (EOC) 16 that includes an importer 18, an exporter 20, and an exciter auxiliary service unit (EASU) 22. An STL transmitter 48 links the EOC with the transmitter site. The transmitter site includes an STL receiver 54, an exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer 18. MPS audio serves as the main audio programming source. In hybrid modes, it preserves the existing analog radio programming formats in both the analog and digital transmissions. MPS data or SPS data, also known as program service data (PSD), includes information such as music title, artist, album name, etc. Supplemental program service can include supplementary audio content as well as program service data.

The importer 18 contains hardware and software for supplying advanced application services (AAS). AAS can include any type of data that is not classified as MPS, SPS, or Station Information Service (SIS). SIS provides station information, such as call sign, absolute time, position correlated to GPS, etc. Examples of AAS include data services for electronic program guides, navigation maps, real-time traffic and weather information, multimedia applications, other audio services, and other data content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link. The importer 18 also encodes a SIG, in which it typically identifies and describes available services. For example, the SIG may include data identifying the genre of the services available on the current frequency (e.g., the genre of MPS audio and any SPS audio).

The importer 18 can use a data transport mechanism, which may be referred to herein as a radio link subsystem (RLS), to provide packet encapsulation, varying levels of quality of service (e.g., varying degrees of forward error correction and interleaving), and bandwidth management functions. The RLS uses High-Level Data Link Control (HDLC) type framing for encapsulating the packets. HDLC is known to one of skill in the art and is described in ISO/IEC 13239:2002 Information technology—Telecommunications and information exchange between systems—High-level data link control (HDLC) procedures. HDLC framing includes a beginning frame delimiter (e.g., '0×7E') and an ending frame delimiter (e.g., '0×7E'). The RLS header includes a logical address (e.g., port number), a control field for sequence numbers and other information (e.g., packet 1 of 2, 2 of 2 etc.), the payload (e.g., the index file), and a checksum (e.g., a CRC). For bandwidth management, the importer 18 typically assigns logical addresses (e.g. ports) to AAS data based on, for example, the number and type of services being configured at any given studio site 10. RLS is described in more detail in U.S. Pat. No. 7,305,043, which is incorporated herein by reference in its entirety.

Due to receiver implementation choices, RLS packets can be limited in size to about 8192 bytes, but other sizes could be used. Therefore data may be prepared for transmission according to two primary data segmentation modes—packet mode and byte-streaming mode—for transmitting objects larger than the maximum packet size. In packet mode the importer 18 may include a large object transfer (LOT) client (e.g. a software client that executes on the same computer processing system as the importer 18 or on a different processing system such as a remote processing system) to segment a "large" object (for example, a sizable image file) into fragments no larger than the chosen RLS packet size. In typical embodiments objects may range in size up to 4,294,967,295 bytes. At the transmitter, the LOT client writes packets to an RLS port for broadcast to the receiver. At the receiver, the LOT client reads packets from the RLS port of the same number. The LOT client may process data associated with many RLS ports (e.g., typically up to 32 ports) simultaneously, both at the receiver and the transmitter.

The LOT client operates by sending a large object in several messages, each of which is no longer than the maximum packet size. To accomplish this, the transmitter assigns an integer called a LotID to each object broadcast via the LOT protocol. All messages for the same object will use the same LotID. The choice of LotID is arbitrary except that no two objects being broadcast concurrently on the same RLS port may have the same LotID. In some implementations, it may be advantageous to exhaust all possible LotID values before a value is reused.

When transmitting data over-the-air, there may be some packet loss due to the probabilistic nature of the radio propagation environment. The LOT client addresses this issue by allowing the transmitter to repeat the transmission of an entire object. Once an object has been received correctly, the receiver can ignore any remaining repetitions. All repetitions will use the same LotID. Additionally, the transmitter may interleave messages for different objects on the same RLS port so long as each object on the port has been assigned a unique LotID.

The LOT client divides a large object into messages, which are further subdivided into fragments. Preferably all the fragments in a message, excepting the last fragment, are a fixed length such as 256 bytes. The last fragment may be any length that is less than the fixed length (e.g., less than 256 bytes). Fragments are numbered consecutively starting from zero. However, in some embodiments an object may have a zero-length object—the messages would contain only descriptive information about the object.

The LOT client typically uses two types of messages—a full header message, and a fragment header message. Each message includes a header followed by fragments of the object. The full header message contains the information to reassemble the object from the fragments plus descriptive information about the object. By comparison, the fragment header message contains only the reassembly information. The LOT client of the receiver (e.g. a software and/or hardware application that typically executes within the data processors 232 and 288 of FIGS. 7 and 8 respectively or any other suitable processing system) distinguishes between the two types of messages by a header-length field (e.g. field name "hdrLen"). Each message can contain any suitable number of fragments of the object identified by the LotID in the header as long as the maximum RLS packet length is not exceeded. There is no requirement that all messages for an object contain the same number of fragments. Table 1 below illustrates exemplary field names and their corresponding descriptions for a full header message. Fragment header messages typically include only the hdrLen, repeat, LotID, and position fields.

TABLE 1

| FIELD NAME | FIELD DESCRIPTION |
| --- | --- |
| hdrLen | Size of the header in bytes, including the hdrLen field. Typically ranges from 24-255 bytes. |
| Repeat | Number of object repetitions remaining. Typically ranges from 0 to 255. All messages for the same repetition of the object use the same repeat value. When repeating an object, the transmitter broadcasts all messages having repeat = R before broadcasting any messages having repeat = R − 1. A value of 0 typically means the object will not be repeated again. |
| LotID | Arbitrary identifier assigned by the transmitter to the object. Typically range from 0 to 65,535. All messages for the same object use the same LotID value. |
| Position | The byte offset in the reassembled object of the first fragment in the message equals 256 * position. Equivalent to "fragment number". |
| Version | Version of the LOT protocol |
| discardTime | Year, month, day, hour, and minute after which the object may be discarded at the receiver. Expressed in Coordinated Universal Time (UTC). |
| fileSize | Total size of the object in bytes. |
| mime Hash | MIME hash describing the type of object |
| filename | File name associated with the object |

Full header and fragment header messages may be sent in any ratio provided that at least one full header message is broadcast for each object. Bandwidth efficiency will typically be increased by minimizing the number of full header messages; however, this may increase the time necessary for the receiver to determine whether an object is of interest based on the descriptive information that is only present in the full header. Therefore there is typically a trade between efficient use of broadcast bandwidth and efficient receiver processing and reception of desired LOT files.

In byte-streaming mode, as in packet mode, each data service is allocated a specific bandwidth by the radio station operators based on the limits of the digital radio broadcast modem frames. The importer 18 then receives data messages of arbitrary size from the data services. The data bytes received from each service are then placed in a byte bucket (e.g. a queue) and HDLC frames are constructed based on the bandwidth allocated to each service. For example, each service may have its own HDLC frame that will be just the right size to fit into a modem frame. For example, assume that there are two data services, service #1 and service #2. Service #1 has been allocated 1024 bytes, and service #2 512 b Now assume that service #1 sends message A having 2048 bytes, and service #2 sends message B also having 2048 bytes. Thus the first modem frame will contain two HDLC frames; a 1024 byte frame containing N bytes of message A and a 512 byte HDLC frame containing M bytes of message B. N & M are determined by how many HDLC escape characters are needed and the size of the RLS header information. If no escape characters are needed then N=1015 and M=503 assuming a 9 byte RLS header. If the messages contain nothing but HDLC framing bytes (i.e. 0x7E) then N=503 and M=247, again assuming a 9 byte RLS header containing no escape characters. Also, if data service #1 does not send a new message (call it message AA) then its unused bandwidth may be given to service #2 so its HDLC frame will be larger than its allocated bandwidth of 512 bytes.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC digital radio broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter engine (exgine) 56 and an analog exciter 60. The STL receiver 54 receives exciter link data, including audio and data signals as well as command and control messages, over the STL link 14. The exciter link data is passed to the exciter 56, which produces the IBOC digital radio broadcasting waveform. The exciter includes a host processor, digital up-converter, RF up-converter, and exgine subsystem 58. The exgine accepts exciter link data and modulates the digital portion of the IBOC digital radio broadcasting waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. Pat. No. 7,512,175, the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, in an AM transmission system, the exciter 56 produces phase and magnitude information and the analog signal is output directly to the high power amplifier.

IBOC digital radio broadcasting signals can be transmitted in both AM and FM radio bands, using a variety of waveforms. The waveforms include an FM hybrid IBOC digital radio broadcasting waveform, an FM all-digital IBOC digital radio broadcasting waveform, an AM hybrid IBOC digital radio broadcasting waveform, and an AM all-digital IBOC digital radio broadcasting waveform.

Figure 2:
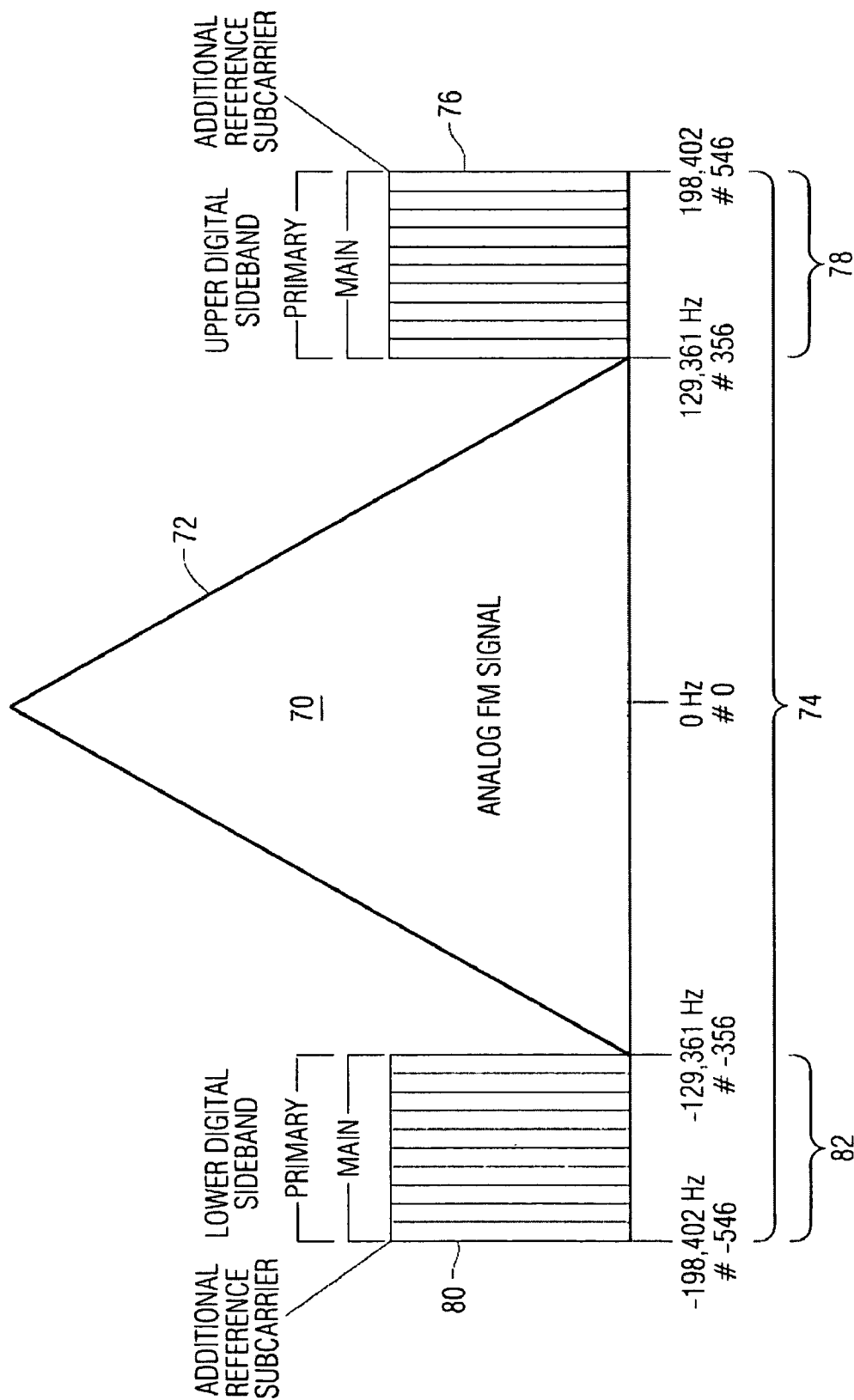
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
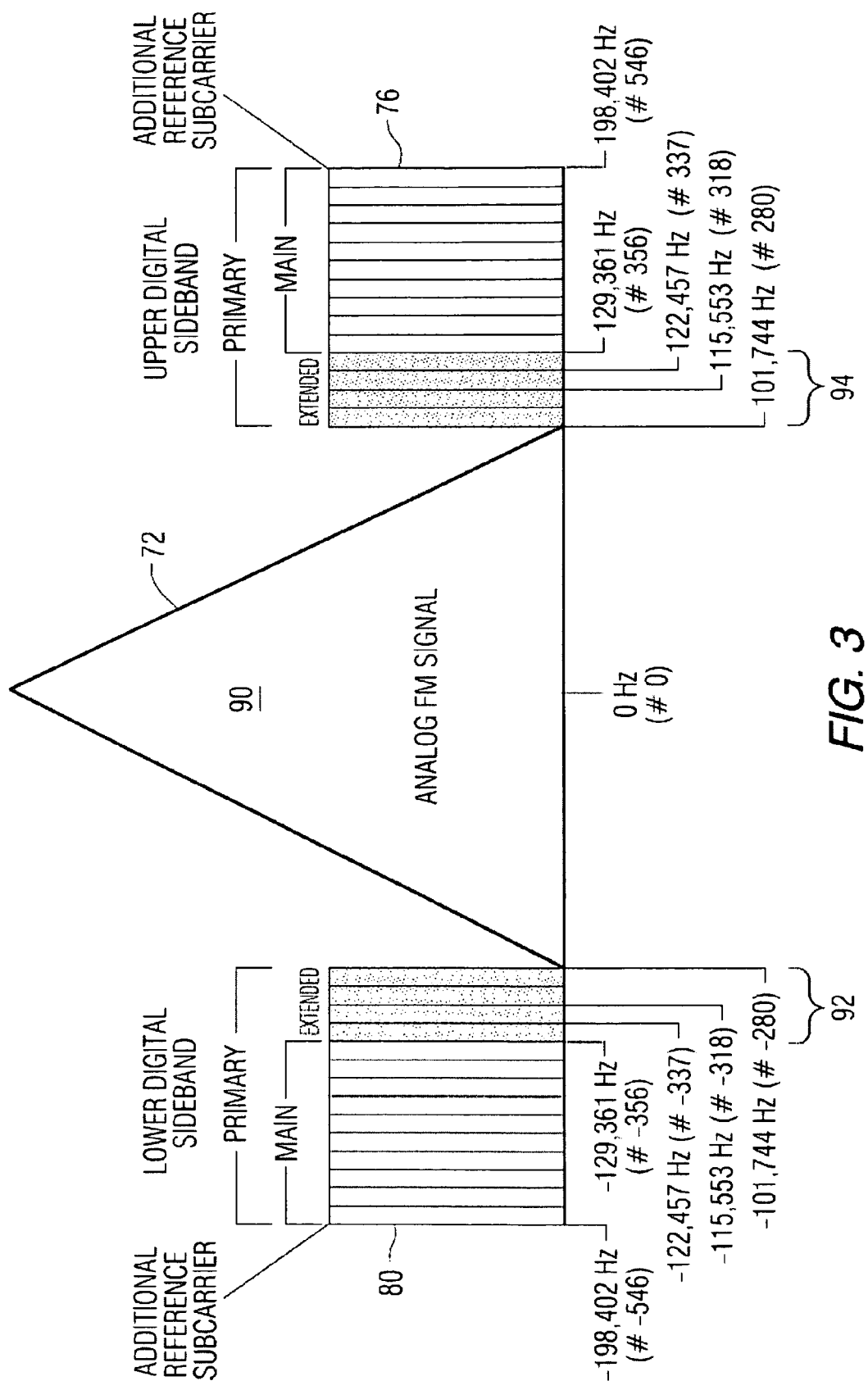
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
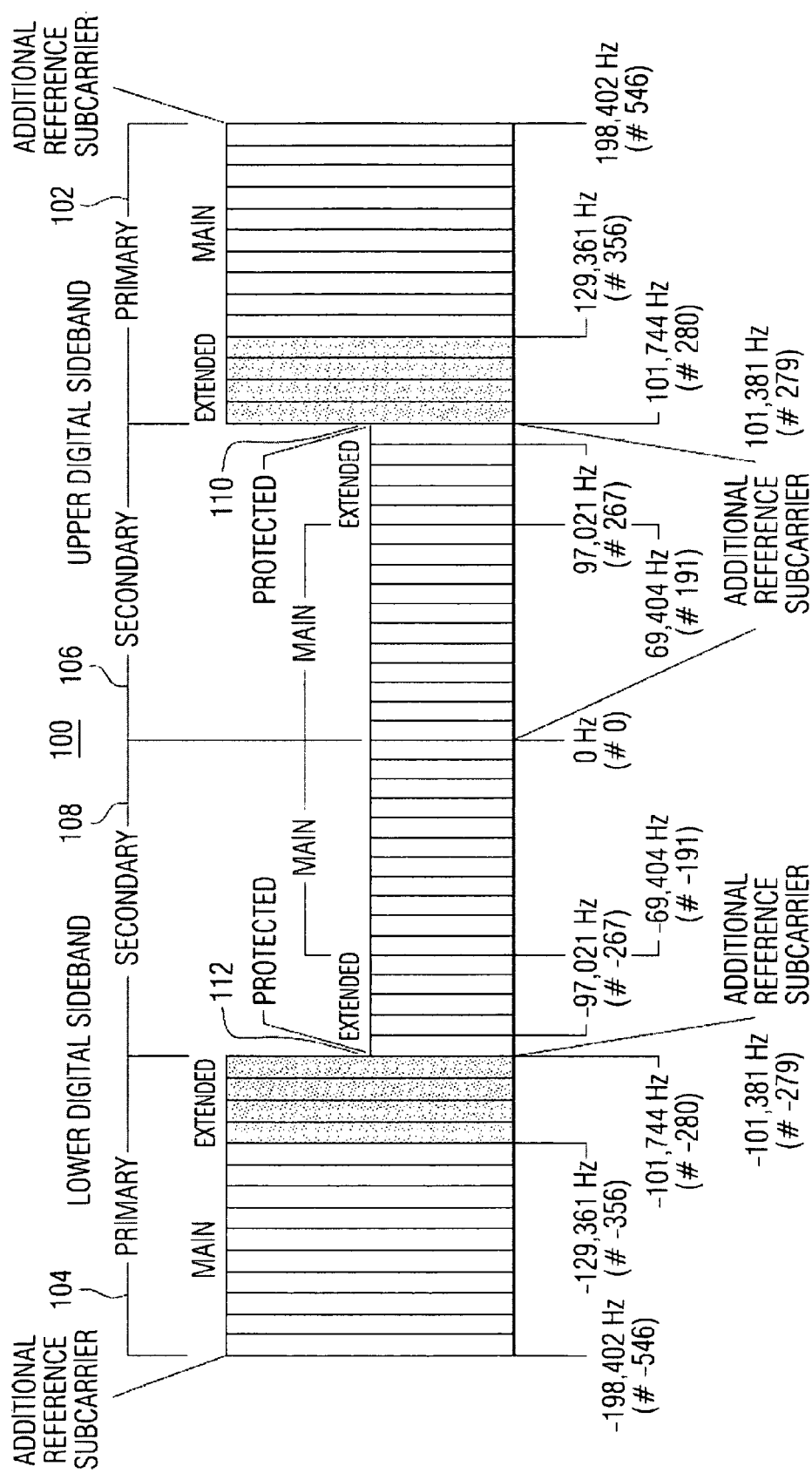
FIG. 4 is a schematic representation of an all-digital FM IBOC waveform.

FIG. 4 is a schematic representation of an all-digital FM IBOC waveform 100. The all-digital waveform is constructed by disabling the analog signal, fully extending the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereophonic, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

Figure 5:
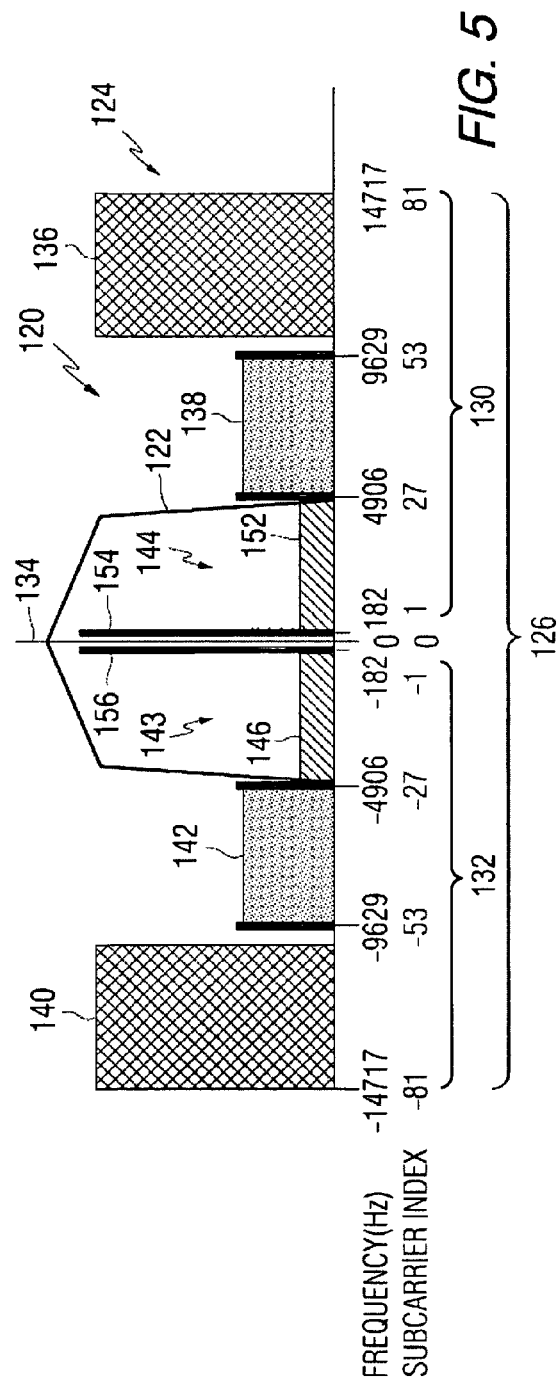
FIG. 5 is a schematic representation of a hybrid AM IBOC waveform.

FIG. 5 is a schematic representation of an AM hybrid IBOC digital radio broadcasting waveform 120. The hybrid format includes the conventional AM analog signal 122 (bandlimited to about ±5 kHz) along with a nearly 30 kHz wide digital radio broadcasting signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC digital radio broadcasting signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. The groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

Figure 6:
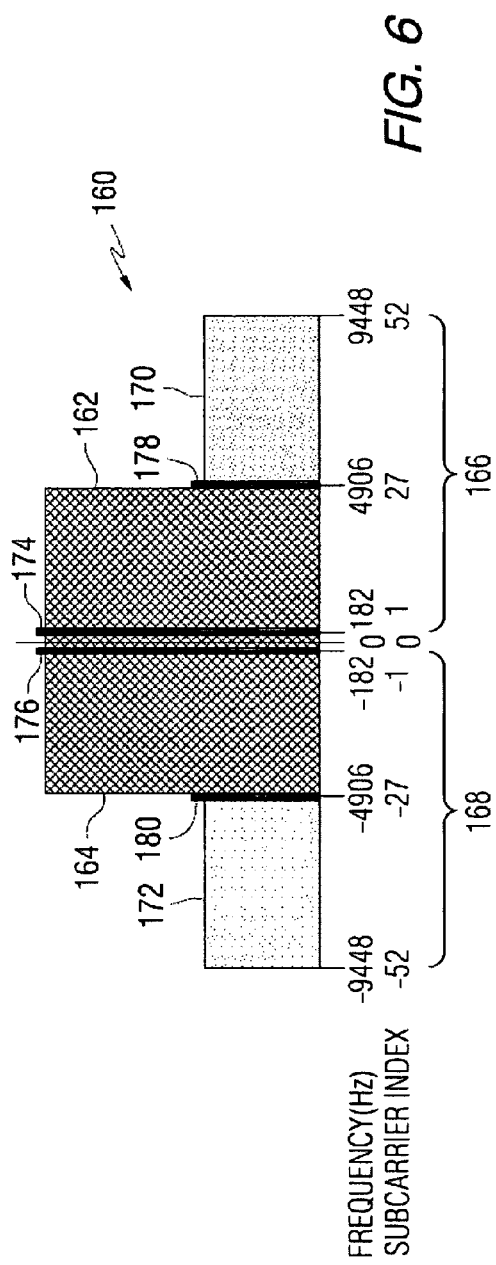
FIG. 6 is a schematic representation of an all-digital AM IBOC waveform.

FIG. 6 is a schematic representation of the subcarrier assignments for an all-digital AM IBOC digital radio broadcasting waveform. The all-digital AM IBOC digital radio broadcasting signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
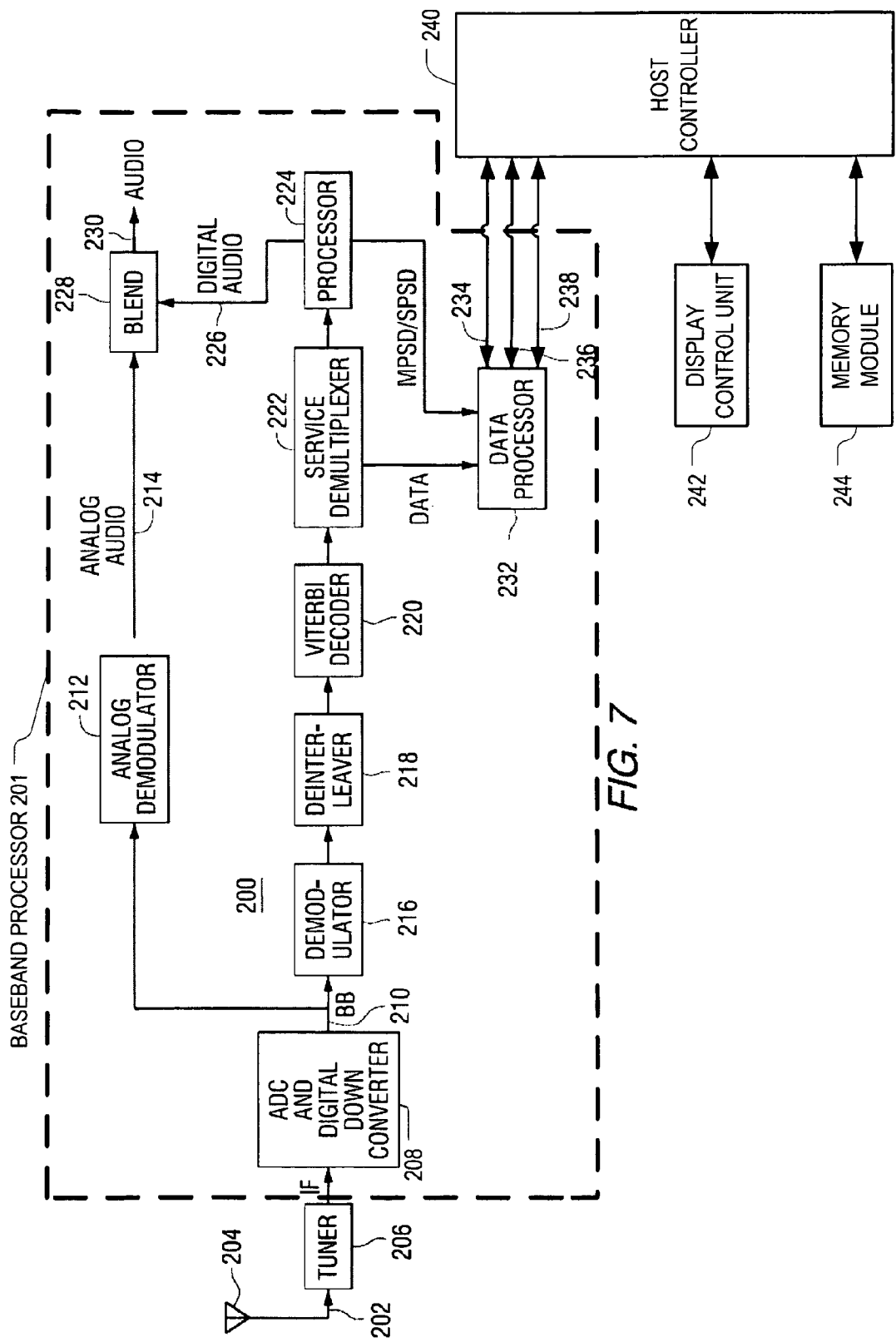
FIG. 7 is a functional block diagram of an AM IBOC digital radio broadcasting receiver in accordance with certain embodiments.

FIG. 7 is a simplified functional block diagram of the relevant components of an exemplary AM IBOC digital radio broadcasting receiver 200. While only certain components of the receiver 200 are shown for exemplary purposes, it should be apparent that the receiver may comprise a number of additional components and may be distributed among a number of separate enclosures having tuners and front-ends, speakers, remote controls, various input/output devices, etc. The receiver 200 has a tuner 206 that includes an input 202 connected to an antenna 204. The receiver also includes a baseband processor 201 that includes a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data lines 234, 236, and 238 may be multiplexed together onto a suitable bus such as an inter-integrated circuit (I$^2$C), serial peripheral interface (SPI), universal asynchronous receiver/transmitter (UART), or universal serial bus (USB). The data signals can include, for example, SIS, MPS data, SPS data, and one or more AAS.

The host controller 240 receives and processes the data signals (e.g., the SIS, MPSD, SPSD, and AAS signals). The host controller 240 comprises a microcontroller that is coupled to the display control unit (DCU) 242 and memory module 244. Any suitable microcontroller could be used such as an Atmel® AVR 8-bit reduced instruction set computer (RISC) microcontroller, an advanced RISC machine (ARM®) 32-bit microcontroller or any other suitable microcontroller. Additionally, a portion or all of the functions of the host controller 240 could be performed in a baseband processor (e.g., the processor 224 and/or data processor 232). The DCU 242 comprises any suitable I/O processor that controls the display, which may be any suitable visual display such as an LCD or LED display. In certain embodiments, the DCU 242 may also control user input components via touch-screen display. In certain embodiments the host controller 240 may also control user input from a keyboard, dials, knobs or other suitable inputs. The memory module 244 may include any suitable data storage medium such as RAM, Flash ROM (e.g., an SD memory card), and/or a hard disk drive. In certain embodiments, the memory module 244 may be included in an external component that communicates with the host controller 240 such as a remote control.

Figure 8:
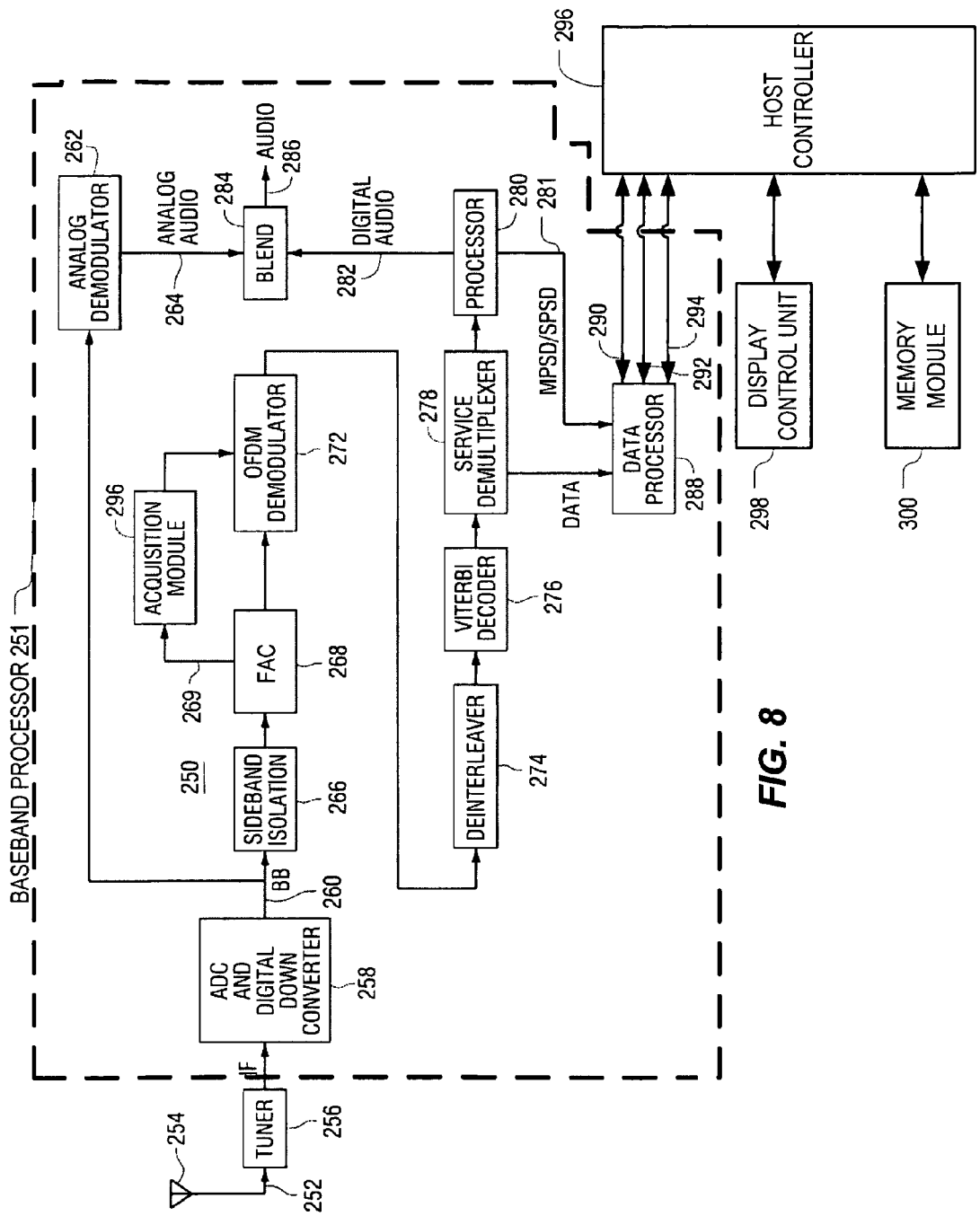
FIG. 8 is a functional block diagram of an FM IBOC digital radio broadcasting receiver in accordance with certain embodiments.

FIG. 8 is a simplified functional block diagram of the relevant components of an exemplary FM IBOC digital radio broadcasting receiver 250. While only certain components of the receiver 250 are shown for exemplary purposes, it should be apparent that the receiver may comprise a number of additional components and may be distributed among a number of separate enclosures having tuners and front-ends, speakers, remote controls, various input/output devices, etc. The exemplary receiver includes a tuner 256 that has an input 252 connected to an antenna 254. The receiver also includes a baseband processor 251. The IF signal from the tuner 256 is provided to an analog-to-digital converter and digital down converter 258 to produce a baseband signal at output 260 comprising a series of complex signal samples. The signal samples are complex in that each sample comprises a "real" component and an "imaginary" component. An analog demodulator 262 demodulates the analog modulated portion of the baseband signal to produce an analog audio signal on line 264. The digitally modulated portion of the sampled baseband signal is next filtered by isolation filter 266, which has a pass-band frequency response comprising the collective set of subcarriers $f_1$-$f_n$ present in the received OFDM signal. First adjacent canceller (FAC) 268 suppresses the effects of a first-adjacent interferer. Complex signal 269 is routed to the input of acquisition module 296, which acquires or recovers OFDM symbol timing offset or error and carrier frequency offset or error from the received OFDM symbols as represented in received complex signal 298. Acquisition module 296 develops a symbol timing offset Δt and carrier frequency offset Δf, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282 and MPSD/SPSD 281. The analog and main digital audio signals are blended as shown in block 284, or the supplemental program signal is passed through, to produce an audio output on line 286. A data processor 288 processes the data signals and produces data output signals on lines 290, 292 and 294. The data lines 290, 292 and 294 may be multiplexed together onto a suitable bus such as an I²C, SPI, UART, or USB. The data signals can include, for example, SIS, MPS data, SPS data, and one or more AAS.

The host controller 296 receives and processes the data signals (e.g., SIS, MPS data, SPS data, and AAS). The host controller 296 comprises a microcontroller that is coupled to the DCU 298 and memory module 300. Any suitable microcontroller could be used such as an Atmel® AVR 8-bit RISC microcontroller, an advanced RISC machine (ARM®) 32-bit microcontroller or any other suitable microcontroller. Additionally, a portion or all of the functions of the host controller 296 could be performed in a baseband processor (e.g., the processor 280 and/or data processor 288). The DCU 298 comprises any suitable I/O processor that controls the display, which may be any suitable visual display such as an LCD or LED display. In certain embodiments, the DCU 298 may also control user input components via a touch-screen display. In certain embodiments the host controller 296 may also control user input from a keyboard, dials, knobs or other suitable inputs. The memory module 300 may include any suitable data storage medium such as RAM, Flash ROM (e.g., an SD memory card), and/or a hard disk drive. In certain embodiments, the memory module 300 may be included in an external component that communicates with the host controller 296 such as a remote control.

In practice, many of the signal processing functions shown in the receivers of FIGS. 7 and 8 can be implemented using one or more integrated circuits. For example, while in FIGS. 7 and 8 the signal processing block, host controller, DCU, and memory module are shown as separate components, the functions of two or more of these components could be combined in a single processor (e.g., a System on a Chip (SoC)).

Figure 9A:
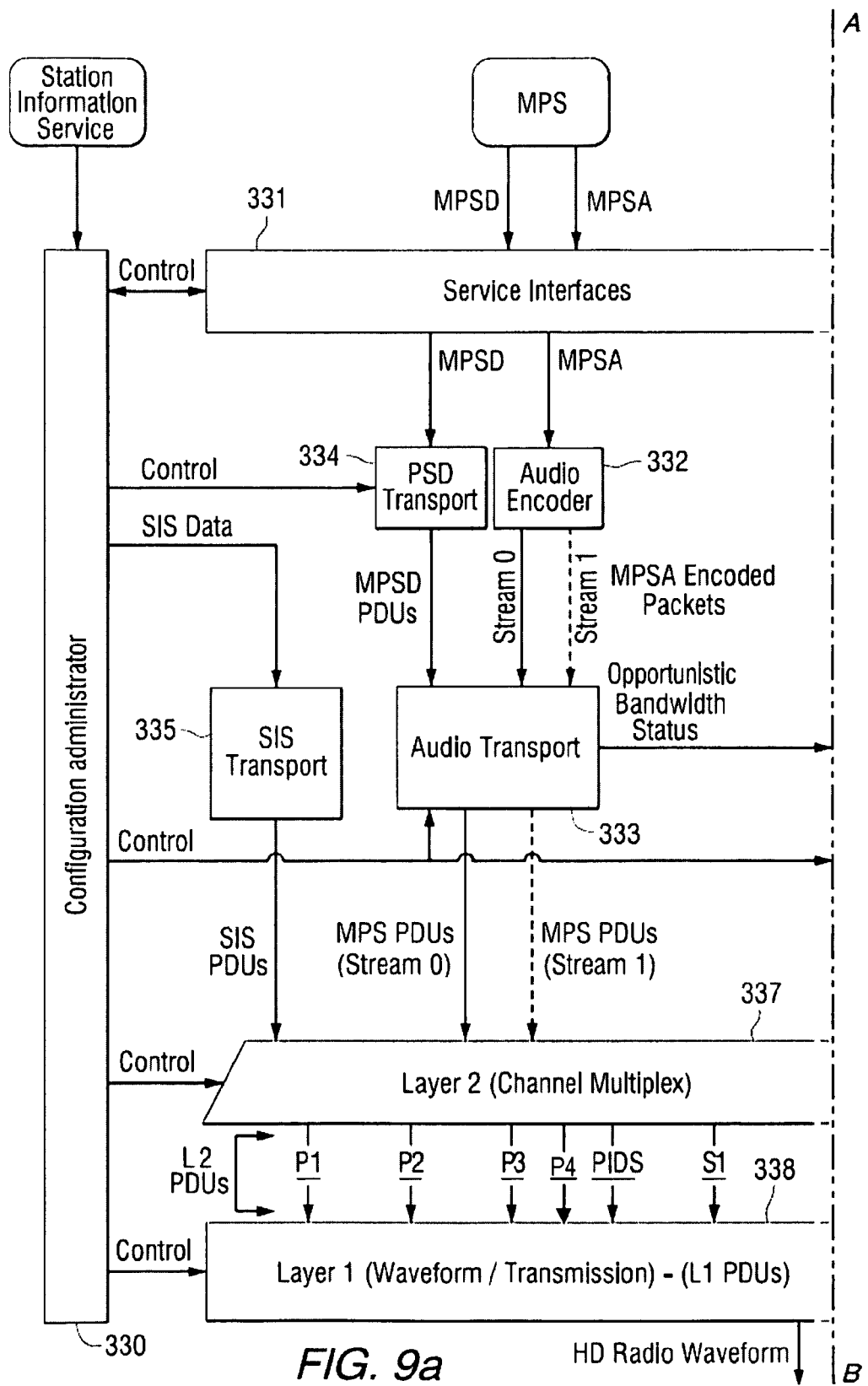
FIGS. 9a and 9b are diagrams of an IBOC digital radio broadcasting logical protocol stack from the broadcast perspective.
Figure 9B:
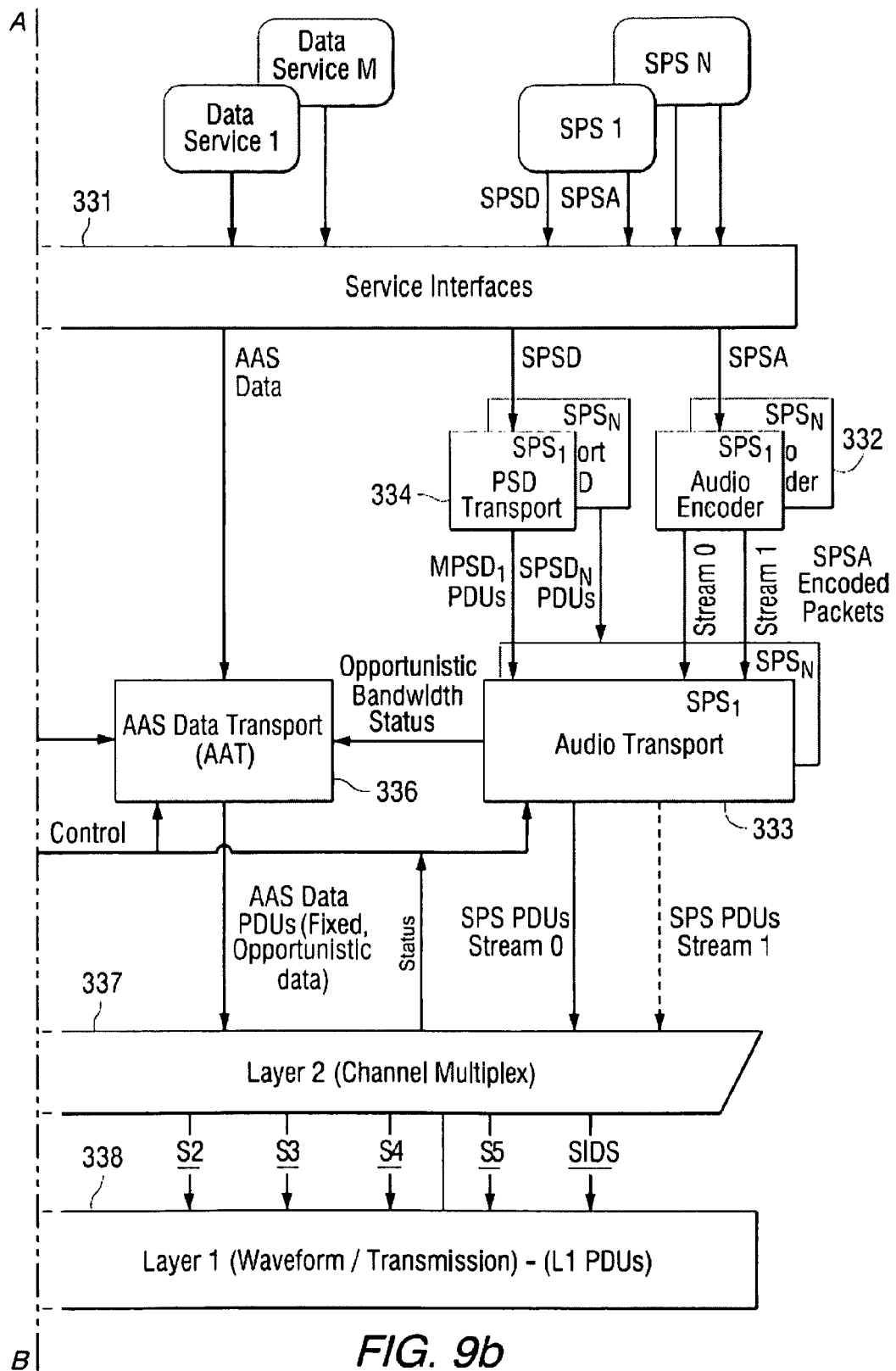

FIGS. 9a and 9b are diagrams of an IBOC digital radio broadcasting logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a and 9b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. For all other data services the interface is in the form of a single API. An audio encoder 332 encodes both MPS audio and SPS audio to produce core (Stream 0) and optional enhancement (Stream 1) streams of MPS and SPS audio encoded packets, which are passed to audio transport 333. Audio encoder 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS, as well as other information conveyed by the station. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service, and possibly mapped into a predefined collection of subcarriers.

Layer 1 data in an IBOC system can be considered to be temporally divided into frames (e.g., modem frames). In typical embodiments, each modem frame has a frame duration ($T_f$) of approximately 1.486 seconds. Each modem frame includes an absolute layer 1 frame number (ALFN) in the SIS, which is a sequential number assigned to every Layer 1 frame. This ALFN corresponds to the broadcast starting time of a modem frame. The start time of ALFN 0 was 00:00:00 Universal Coordinated Time (UTC) on Jan. 6, 1980 and each subsequent ALFN is incremented by one from the previous ALFN. Thus the present time can be calculated by multiplying the next frame's ALFN with $T_f$ and adding the total to the start time of ALFN 0.

There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC digital radio broadcasting waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
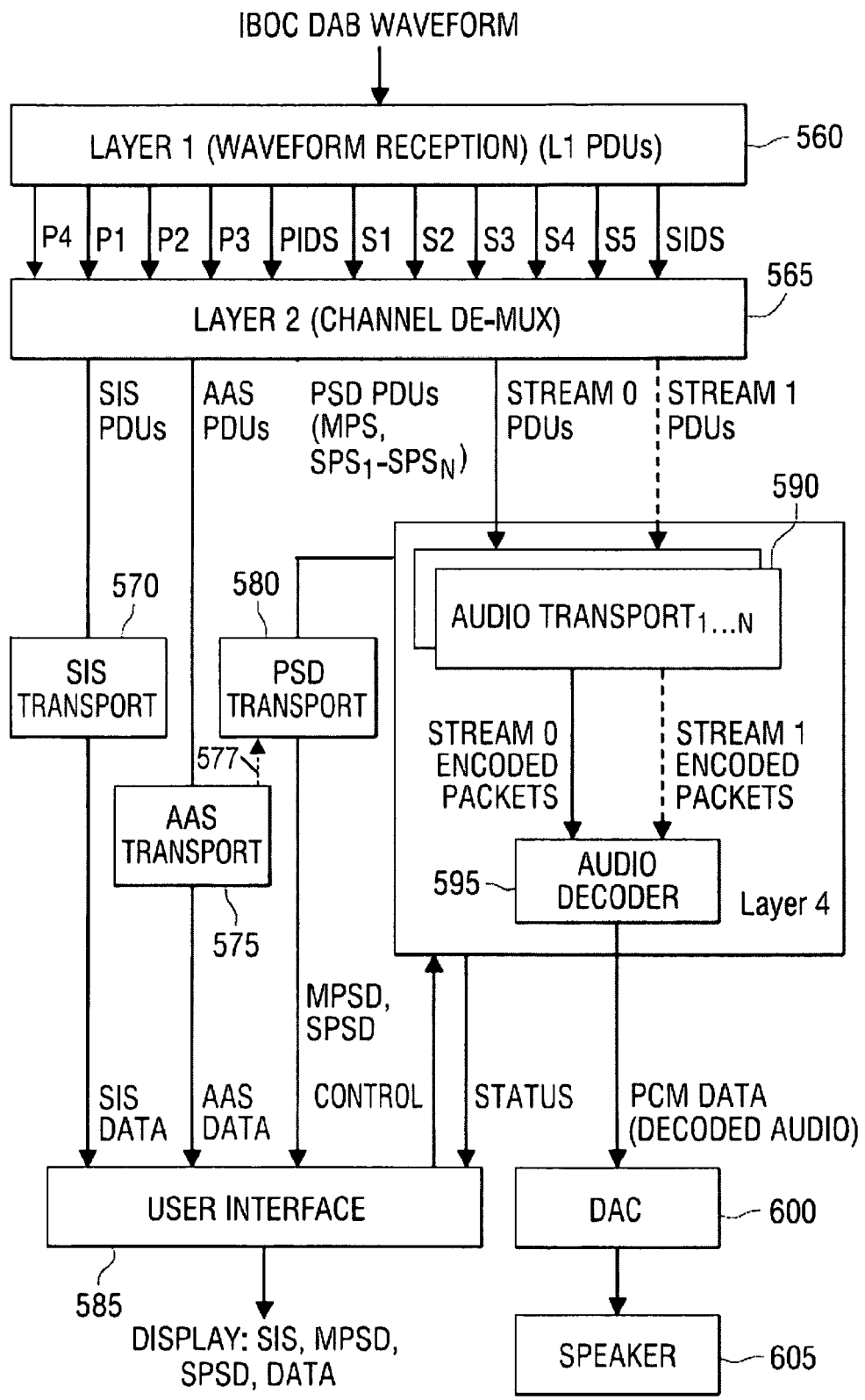
FIG. 10 is a diagram of an IBOC digital radio broadcasting logical protocol stack from the receiver perspective.

FIG. 10 shows a logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P4, Primary IBOC Data Service Logical Channel (PIDS), S1-S5, and SIDS. Layer 1 produces L1 PDUs corresponding to the logical channels and sends the PDUs to Layer 2 (565), which demultiplexes the L1 PDUs to produce SIS PDUs, AAS PDUs, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). Encapsulated PSD data may also be included in AAS PDUs, thus processed by the AAS transport processor 575 and delivered on line 577 to PSD transport processor 580 for further processing and producing MPSD or SPSD. The SIS data, AAS data, MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and information related to seek or scan for radio stations broadcasting an all-digital or hybrid IBOC signal. Layer 4 also provides status information to the user interface.

The following describes an exemplary process for digital radio broadcast transmission and reception of media content for synchronized rendering at a digital radio broadcast receiver in accordance with exemplary embodiments. First, a general description of exemplary components and operation of a digital radio broadcast transmitter and digital radio broadcast receiver will be provided. Then exemplary embodiments of two techniques for transmitting and receiving synchronized media content will be discussed. Finally, exemplary applications of the disclosed embodiments will be discussed. Note that in the following description, reference will be made simultaneously to components of both the exemplary AM IBOC receiver of FIG. 7 and the exemplary FM IBOC receiver of FIG. 8 since the operation of both is substantially similar for purposes of the present disclosure. Thus, for example, the host controller is referred to below as the host controller 240, 296.

Figure 11:
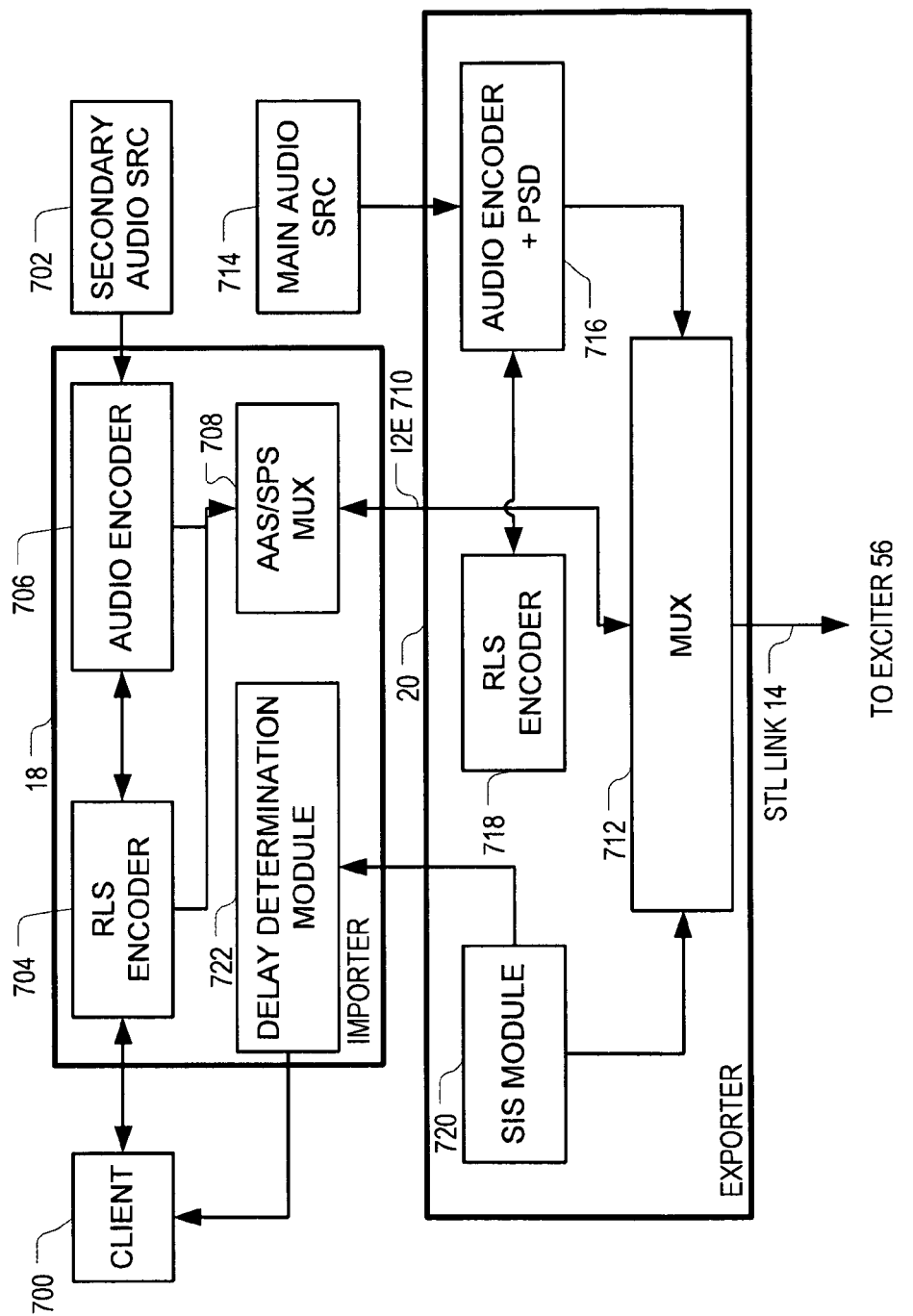
FIG. 11 is a functional block diagram of digital radio broadcast transmitter components in accordance with certain embodiments.

An exemplary functional block diagram of the transmit-side components of a digital radio broadcast system is illustrated in FIG. 11. As discussed above, the functions illustrated in FIG. 11 can be performed in a suitable combination of the importer 18, the exporter 20, and a client 700. These components can comprise a processing system that may include one or more processing units that may be co-located or distributed and that are configured (e.g., programmed with software and/or firmware) to perform the functionality described herein, wherein the processing system can be suitably coupled to any suitable memory (e.g., RAM, Flash ROM, ROM, optical storage, magnetic storage, etc.). The importer 18 communicates with a client application 700 via a request/response-type application program interface (API) (i.e., the importer 18 requests data from the clients) to receive data content such as album art, image slide shows, scrolling text information, closed captioning, product purchase information, and video. The client application 700 can be any suitable program that has access to the data content, such as via a database or file directory, and that is configured to prepare and send the media content to the importer 18 in response to the importer's requests.

As discussed above, the importer 18 prepares the data content and secondary audio (if any) from a secondary audio source 702 for digital radio broadcast transmission. It should be noted that data content from the client 700 travels through a first signal path in the importer 18 and the secondary audio for the SPS travels through a second signal path different from the first in the importer 18. Specifically, data content from the client 700 is received by an RLS encoder 704 as AAS data where it is encapsulated as discussed above. The data content can be encapsulated using either the packet-streaming technique (e.g., LOT) or the byte-streaming technique. Once the data content is encapsulated by the RLS encoder 704, the RLS packets are sent to the AAS/SPS multiplexer 708 where they are multiplexed with any secondary audio (e.g., time-division multiplexed). It should be noted that data is typically encoded via the RLS protocol which is different than the protocol used to transport the audio (e.g., audio transport 333 illustrated in FIG. 9b), and is therefore asynchronous with the audio. Secondary audio from the secondary audio source 702 is digitally encoded to produce compressed SPSA audio frames by the audio encoder 706. Any suitable audio encoder can be used such as an HDC encoder as developed by Coding Technologies of Dolby Laboratories, Inc., 999 Brannan Street, San Francisco, Calif. 94103-4938 USA; an Advanced Audio Coding (AAC) encoder; an MPEG-1 Audio Layer 3 (MP3) encoder; or a Windows Media Audio (WMA) encoder. The secondary audio source 702 may also include PSD such as music title, artist, album name, etc., which is encoded as SPSD PDUs. The SPSD PDUs are passed from the secondary audio source 702 through the audio encoder 706 to the RLS encoder 704. The RLS encoder then encapsulates the SPSD PDUs and passes RLS frames back to the audio encoder 706. The audio encoder 706 combines the SPSA audio frames and the RLS encoded SPSD (if any) into a single SPS PDU and outputs it to the AAS/SPS multiplexer 708. The AAS/SPS multiplexer 708 then outputs packets to the exporter 20 via the importer-to-exporter (I2E) interface 710.

The I2E interface 710 is a two-way handshake link that exists between the importer 18 and the exporter 20 to request AAS/SPS frames for a specific modem frame. The I2E interface is typically a TCP/IP connection although it could be any other suitable type of communication connection. As part of the I2E interface, there is a configurable frame buffer in the exporter 20 that can be used to overcome poor network performance when a TCP connection is used. The I2E interface 710 outputs the multiplexed AAS/SPS packets to the multiplexer 712 in the exporter 20.

The main audio travels through a separate signal path from the secondary audio and the data content, and therefore incurs a delay through the digital broadcast system that is distinct from both the data content and the secondary audio. Specifically, the main audio content is input at the exporter 20, while the data content and the secondary content are input at the importer 18. The main audio is provided by the main audio source 714, and is digitally encoded to produce compressed MPSA audio frames by the audio encoder 716. Any suitable audio encoder can be used as described above. The main audio source 714 may also include PSD that is encoded as MPSD PDUs. The MPSD PDUs are passed from the audio encoder 716 to the RLS encoder 718, where they are encapsulated and sent back to the audio encoder 716 as RLS frames. The MPSD and MPSA packets are combined into a single MPS PDU and then sent to the multiplexer 712. A SIS module generates the SIS information, including calculating the current ALFN, and sends the SIS PDUs to the multiplexer 712. The multiplexer 712 multiplexes the MPS, SPS, AAS, and SIS to form a modem frame. The multiplexer 712 then outputs the modem frame via the STL link 14 (described with reference to FIG. 1 above) to the exciter 56, which produces the IBOC digital radio broadcasting waveform.

As noted above, the AAS, SPS and MPS may all travel through different signal paths in the digital radio broadcast transmission system thereby incurring different delays. The AAS incurs typically fixed delays due to RLS encoding and multiplexing in the importer 18. The SPS incurs not only the delays for encoding (which is different than the RLS encoding delay for data as previously discussed) and multiplexing, but also another typically fixed delay for audio encoding in the importer 18. The delay for the SPS typically requires approximately six (6) modem frames of buffering to account for processing time. Furthermore, the SPS and AAS both incur an additional configurable delay through the I2E link that is typically on the order of 20 modem frames. As noted above, the MPS signal path does not pass through the I2E link and typically requires only approximately one (1) modem frame of buffering to account for processing time in the exporter 20. In addition, the portion of the digital radio broadcast transmitter downstream of the exporter 20 typically incurs an additional two (2) modem frames of delay due to buffering and processing. While approximate delay times have been provided for exemplary purposes, it should be apparent that these examples in no way limit the scope of this disclosure or the claims.

Similarly, the MPS and SPS audio and the AAS may travel through different signal paths in the digital radio broadcast receiver. Specifically, as discussed with reference to FIGS. 7 and 8, the MPS and SPS are decoded and output directly from the baseband processor 201, 251 to the audio output 230, 286, whereas the AAS is transmitted as data content to the host controller 240, 296, from which it can be rendered via the display control unit 242, 298. The digital radio broadcast receiver typically incurs an approximately two (2) modem frames of delay due to buffering and processing.

While it has been noted that the delays will typically vary from one service to another, it should also be noted that these different delays will also vary from one radio frequency to another, and from one geographic location to another. For example, since different radio stations may employ different hardware, software and/or configurations, the delays through the systems due to processing and buffering will not be the same.

As a result of these varying delays due to the multiple signal paths, audio and data content can incur different latencies through the digital radio broadcast system. The digital radio broadcast transmitter accounts for these different latencies so as to render audio and data content in synchronization at the digital radio broadcast receiver. The importer 18 includes a delay determination module 722 that calculates approximate values for the various delays of data and audio through the signal paths in the digital radio broadcast system and outputs these values to the client 700. The delay determination module 722 can be implemented in hardware, software, or any suitable combination thereof. To determine the audio latency, the delay determination module 722 adds the various delays including the I2E delay, the audio buffering delay, and the transmit/receive delays. Similarly, to determine the data content delay, the delay determination module 722 adds the various delays including the I2E delay, the data buffering delay, and the transmit/receive delays. In exemplary embodiments, the delay determination module 722 receives the current ALFN ($T_C$) (i.e., the ALFN for the modem frame currently being generated by the exporter 20) from the SIS module 720. The latency values can then be used to calculate a time at which the audio or data content delivered to the importer 18 is to be rendered at the digital radio broadcast receiver by adding $T_C$ to the calculated latency. The times can be expressed, for example, in terms of ALFNs or fractions thereof, or in terms of units of time such as seconds, milliseconds, etc. An exemplary calculation of the time at which audio or data is to be rendered at a digital radio broadcast receiver expressed in terms of ALFNs could be:

Audio ALFN($T_A$)ALFN=I2E Delay(ALFNs)+Audio Buffering(ALFNs)+Tx/Rx Processing(ALFNs)+ $T_C$, and Data ALFN($T_D$)=I2E Delay(ALFNs)+Data Buffering (ALFNs)+Tx/Rx Processing (ALFNs)+$T_C$ It should be noted that $T_D$, i.e., the time at which data content that is delivered to the importer 18 is to be rendered by the digital radio broadcast receiver, is typically available only if the data is being transmitted via byte-streaming mode as discussed above. Typically, packet delivery times cannot be predicted because the importer 18 does not know whether any individual packet of data will be transmitted in a given modem frame.

The delay determination module 722 sends the $T_C$, $T_A$, and $T_D$ (if available) to the client application 700. Given these values the client application 700 can apply the proper timing either in the delivery of the data content to the importer 18 or in the packaging of the data content with timing instructions such that satisfactory time synchronization can be achieved at the receiver as discussed in more detail below.

Figure 12:
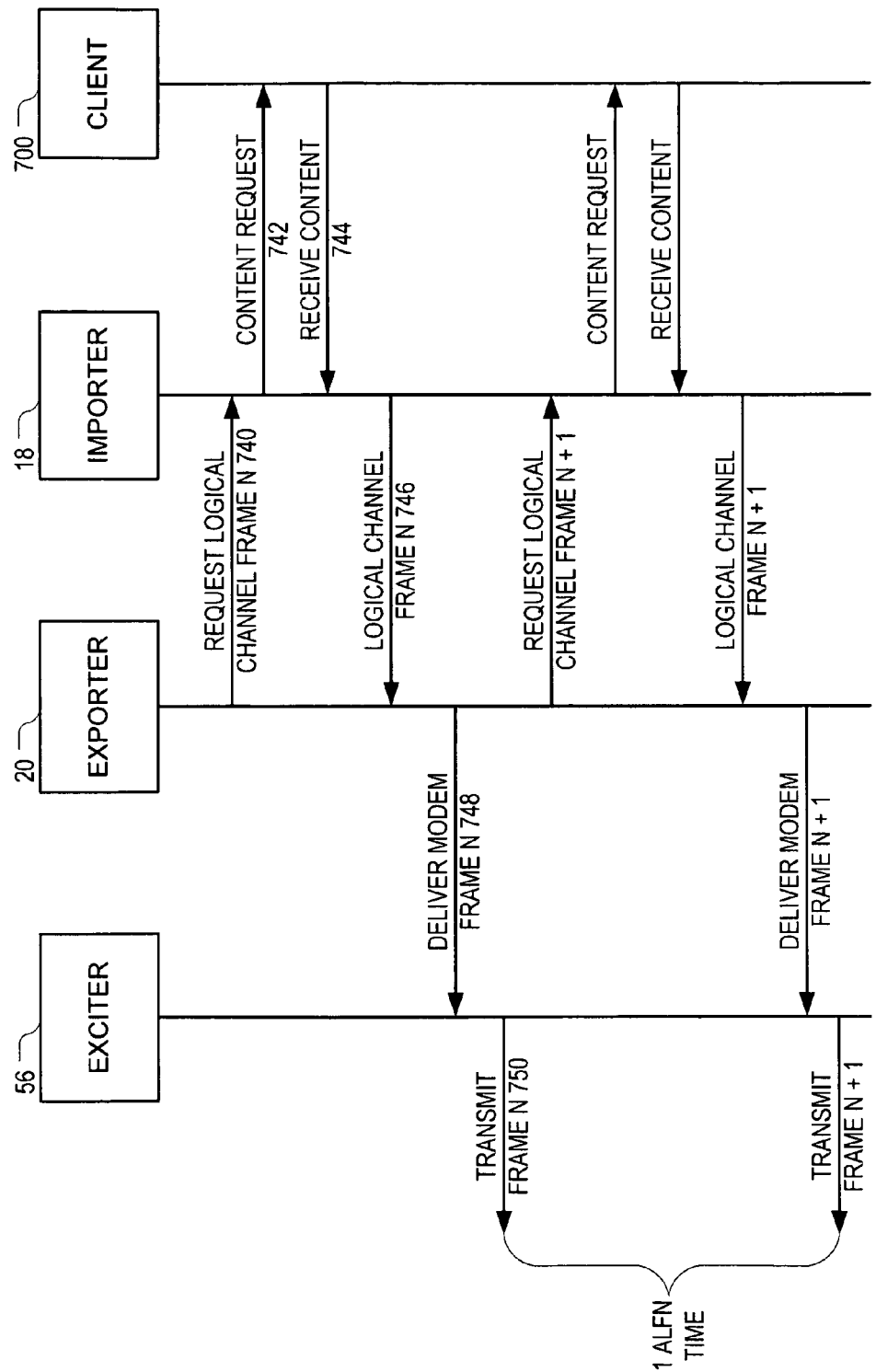
FIG. 12 is an exemplary signal diagram for creating a modem frame in accordance with certain embodiments.

FIG. 12 illustrates an exemplary sequence of generating a modem frame in the digital radio broadcast transmitter. Initially, the exporter 20 sends a request message 740 to the importer 18 via the I2E interface that includes the current ALFN (N). This request message 740 notifies the importer 18 that the exporter is generating a modem frame identified by N and requests content for a logical channel. While described for exemplary purposes in terms of a single logical channel, it should be readily apparent that the same process could apply to multiple logical channels generated for the current modem frame. The importer 18 generates a content request message 742 for the client 700 that includes N, the audio ALFN, and the data ALFN (if any), which are determined as discussed above. In response, the client 700 retrieves and sends data content 744 to the importer 18. As discussed above, the client 700 applies the proper timing either in the delivery of the data content to the importer 18 or in the packaging of the data content with timing instructions such that satisfactory time synchronization can be achieved at the receiver. The importer 18 generates data for a logical channel based on the content from the client 700 and transmits this data 746 to the exporter 20 via the I2E interface. The exporter 20 then generates and delivers modem frame N 748 to the exciter 56 via the STL link 14 for digital radio broadcast transmission 750. This process occurs within one modem frame time and is repeated for each modem frame. Thus modem frame N+1 also shown in FIG. 12 is generated and transmitted in the same manner.

Figure 13:
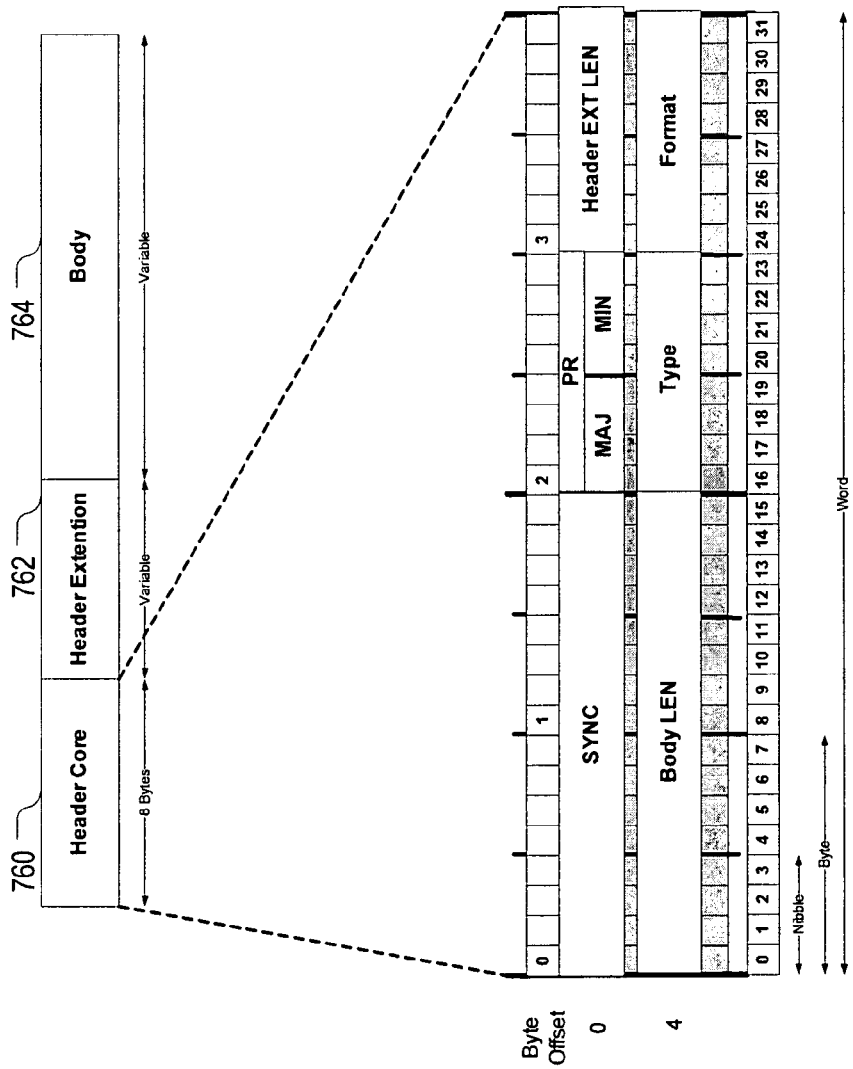
FIG. 13 is an exemplary content protocol packet in accordance with certain embodiments.

In exemplary embodiments the client 700 adds a header to the data content to facilitate transport and decoding. FIG. 13 illustrates a data content packet in accordance with an exemplary content protocol. The packet includes an ordered collection of the following three items: a header core 760, a header extension 762, and a body 764. The header core 760 includes information regarding the size and the content of the payload to enable a digital radio broadcast receiver to determine whether it has system resources to decode and render the content. The header extension 762 includes information that supports the handling or rendering of the included content. And the body 764 carries the payload, where the structure and content of the data in the payload is described in the header core 760 and the header extension 762.

The exemplary header core 760 is 8 bytes in length. While exemplary lengths are used herein for illustrative purposes, any suitable lengths may be used as would be readily apparent to one of ordinary skill in the art. The header core 760 includes a number of fields. First, there is a SYNC field, which is a two-byte ASCII sequence that identifies the start of the packet. These SYNC bytes can be used by the digital radio broadcast receiver to defragment the packets when byte-streaming mode is used. Second, there is a one-byte PR field that describes the major revision (MAJ) and the minor revision (MIN) of the current protocol being used. This can be desirable to ensure that the receiver is compatible with the protocol being used to encode the data content. Third, there is a one-byte Header EXT LEN field that describes the length of the extension header in bytes. Fourth, there is a two-byte Body LEN field that describes the length of the body 764 in bytes. In certain embodiments, a Body LEN of zero could indicate that the body length is greater than $2^{16}$ (65536) bytes and that there is a header extension parameter describing the actual body length. Fifth, there is a one-byte Type field that indicates the type of data included in the body 764. Finally, there is a one-byte Format field that indicates the format of the data included in the body 764. Exemplary Type and Format values are shown in Table 2 below.

TABLE 2

| Type Value | Type Interpretation | Format Value | Format Interpretation |
| --- | --- | --- | --- |
| 0x0 | PSD | 0x0 | XML |
|  |  | 0x1 | ID3 |
| 0x1 | Audio | 0x0 | Uncompressed PCM samples |
|  |  | 0x1 | HDC |
| 0x2 | Image | 0x0 | JPEG |
|  |  | 0x1 | PNG |
|  |  | 0x2 | GIF |
| 0x3 | Text | 0x0 | ISO/IEC 8859-1:1998 |
|  |  | 0x4 | ISO/IEC 10646-1:2000 |
| 0xff | Other | N/A | Application specific |

As illustrated in Table 2, the data content in the packets can include XML, ID3 tags (for example as described in the ID3 informal standard version 2.3.0 available at http://www.id3.org), uncompressed pulse code modulated (PCM) audio samples, HDC encoded audio, JPEG images, PNG images, GIF images, ISO/IEC 8859-1:1998 encoded text, ISO/IEC 10646-1:2000 encoded text, or a form of data that is application specific. While these data formats are shown for exemplary purposes, these examples in no way limit the scope of the disclosure or the claims and any other form of data could be included as would be known to one of ordinary skill in the art such as, for example, MP3 audio, TIF images, MPEG-4 video, PDF or any other suitable data format.

The exemplary header extension 762 can be of variable length and includes a number of parameters that describe various attributes associated with the content. Each parameter includes a one-byte Parameter ID field and a variable length Body field. An exemplary list of parameters is shown in Table 3 below.

TABLE 3

| Parameter ID | Length (bytes) | Description |
| --- | --- | --- |
| 0 | 4 | StartALFN: Specifies the time in ALFNs when the content is to be presented. If this value is 0 or absent the content should be presented immediately. |
| 1 | 4 | EndALFN: Specifies the time in ALFNs when the content is no longer presented. If this value is 0 or absent the content should be presented indefinitely until subsequent content is received. |
| 2 | 1 | Duration: Specifies the duration in ALFNs of content presentation. If this value is 0 or absent the content should be presented indefinitely until subsequent content is received. |
| 3 | 1 | Block Offset: Specifies the block offsets of the start and end ALFNs. The first 4 bits represent the start offset and the next 4 bits represent the end offset. |
| 4 | 4 | ContentID: A unique ID to identify or correlate a particular piece of content. The structure of the ID is typically application specific. |
| 5 | 4 | Extended Body Length: Indicates the body length in the number of bytes. Used in conjunction with a Body LEN of 0 in the header core. |

As illustrated in Table 3, the header extension 762 can include start and end times, and durations for presenting content in the body 764. Additionally, the header extension can include a block offset that allows the start and end content presentation times to be offset in increments of 1/16 of the modem frame time (i.e., if the modem frame time is 1.48 seconds, then one block is 92.5 msecs in length). The block offset thereby allows fine-tuning of the synchronization of the data content with the audio to within approximately 92.5 msecs. Certain embodiments may provide a content reuse capability. For example, the extension header may include a Content ID descriptor that uniquely identifies the content described by the component. Receivers that have the capability to store content can store the content referenced by the Content ID using the Content ID as an index. If in the future the receiver identifies the same Content ID, instead of accessing the specified RLS port to retrieve the content, the receiver can instead retrieve the content from memory. This may be particularly advantageous for content that is repetitive. For example, assume that a Top 40s radio station broadcasts a limited number of songs. Therefore the receiver could store the album art associated with each of these songs and could retrieve and display the album art as soon as each song begins.

In exemplary embodiments, data control instructions (e.g., SIG) are included in each modem frame that associate the data content from the client 700 with the audio. These data control instructions cause the receiver to read the appropriate RLS port to access data content that is to be rendered in synchronization with the audio. As discussed above, each modem frame typically includes a SIG. The SIG includes information regarding the data and audio services that are advertised in SIS, including RLS port assignments. SIG allows the receiver to determine that a service exists, pursue reception of the indicated service, and render the service if it is selected. However, it should be noted that SIG does not necessarily provide access to the contents of the service, for example, if the service is a CA service. SIG is broadcast over a fixed RLS port by the radio station that provides the service and is periodically updated.

Structurally, the SIG contains information pertaining to each service being broadcast that is organized into service records. Typically, as each client connects to the importer, a new audio or data service record will be constructed for that service. Service records typically include information descriptors (i.e., attributes of the service). For example, an audio service record will typically include information that describes the genre, additional processing instructions, and a service display name. In addition, a service may have other services associated with it. For example, an SPS may have data services associated with it as subservices that could include scrolling text, album art, closed captioning, product purchase information (e.g., ID3 tags), etc. In this case, the information about the associated subservice is included in the service record of the main service. When a digital radio broadcast receiver receives and decodes the SIG, it parses the information of the service records to determine whether there are any associated subservices and renders any information about that subservice with the current service. For example, if the receiver tunes to and renders SPS1, and the service record for SPS1 includes a subservice that includes album art, then the receiver will access the associated RLS port containing the album art.

Figure 14:
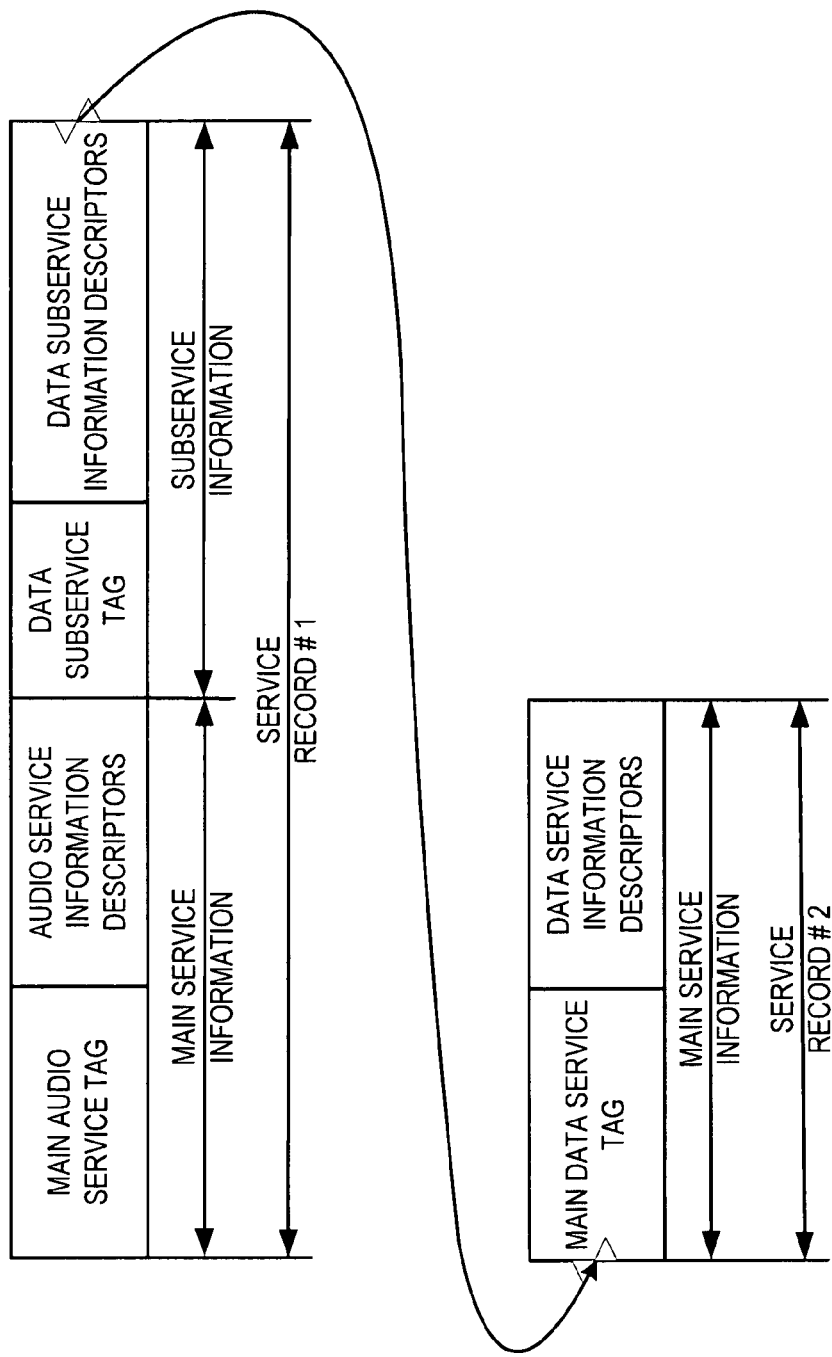
FIG. 14 is an exemplary data control service in accordance with certain embodiments.

An exemplary SIG message is illustrated in FIG. 14. The example in FIG. 14 includes two concatenated service records, Service Record #1 and Service Record #2. Service Record #1 describes an audio service (e.g., SPS) and an associated data service. Service Record #1 includes a main audio service and a single associated data service, indicated by the main and subservice tags. The main service is an audio service and includes audio service information descriptors. The subservice is an associated data service (e.g., album art or closed captioning information) and includes data service information descriptors. Likewise, Service Record #2 describes only a main data service (e.g., stock ticker or weather information). Service Record #2 includes a main data service tag and data service information descriptors.

While the data content is described above as being associated with the audio by including subservice information descriptors in the SIG, in certain embodiments the data content can be associated with the audio in other ways. For example, a descriptor of the main service could include a link to associate the audio service with a different data service record.

After the digital radio broadcast transmitter broadcasts the modem frames over the air, a digital radio broadcast receiver then receives the modem frames and processes them so that the included content can be rendered for an end user. Advantageously, a receiver may be able to receive programming information regarding stations that broadcast only in legacy analog waveform and otherwise have no digital or other means of conveying their program schedule.

An exemplary process of receiving, processing, and rendering the data content is described below. First, the user powers on the digital radio broadcast receiver and then tunes the receiver to a desired radio station. On power-up, the host controller 240, 296 begins to repeatedly request various types of data (e.g., SIS, SIG, and LOT segments) from the baseband processor 201, 251. The baseband processor 201, 251 retrieves the SIS and SIG from the modem frame, decodes them, and communicates them to the host controller 240, 296 responsive to a request. The host controller 240, 296 then parses the SIG record of the currently selected service to determine whether the station is broadcasting any associated data content. This indication will typically include either identifying a component associated with the audio component or a descriptor associating the audio component with another data service. If associated data content is available on a particular station, the SIG will also indicate the RLS port number on which the associated data content can be received.

In certain embodiments the host controller may cause the display control unit 242, 298 to render an indication to the user that associated data is available. For example, in closed captioning implementations this could be in the form of a lighted "Closed Captioning Available" button or an icon on a GUI. In certain embodiments, the user may be able to choose whether to activate the closed captioning at this point. The user can then activate the closed captioning, e.g., by pressing a suitable button, which can be for example, either a physical button on the receiver or a soft key button on a GUI. In certain embodiments, the host controller may automatically begin rendering available data content without requiring user input.

While the receiver is tuned to a particular radio station, the baseband processor 250, 251 is continuously receiving and buffering RLS packets that are broadcast from the radio station. In embodiments directed to packet-mode transmission using LOT protocol, the data processor 232, 288 may also be reassembling the packets into objects. These objects are then passed to the host controller 240, 296 responsive to a request (e.g. a polling event). Alternatively, RLS packets could be passed to the host controller 240, 296, which could then reassemble them into objects. Additionally, in embodiments directed to byte-streaming data transmission, the RLS packets could be reassembled in either the data processor 232, 288 or the host controller 240, 296. Furthermore, the data content can then be reconstructed based on the content protocol described with reference to FIG. 13 above. For example, the data content packets can be distinguished and reassembled by utilizing the SYNC bytes of the header core 760. The receiver can determine the revision of the content protocol based on the PR fields to determine whether the content protocol is supported. Further, the header core 760 provides the type and format of the data content so that it may call the appropriate rendering application.

The host controller 240, 296 then renders and/or stores the reassembled data content. The process of rendering and/or storing the data content may vary depending on the specific implementation and the receiver capabilities. For example, closed captioning information is typically rendered immediately in synchronization with the audio (i.e., the synchronization is performed by the digital radio broadcast transmitter and the receiver makes no determinations about the relative rendering timing of the data content) and the data content is not stored. Similarly, radio karaoke and streaming text would also be immediately rendered and not stored. On the other hand, album art, image slide shows, and product purchase information will typically be stored for later rendering in synchronization with the audio based on the timing instructions included in the header extension of the content protocol packet. In other words, the data content is synchronized with the audio based on timing instructions inserted by the digital radio broadcast transmitter. In certain embodiments that allow for content reuse, the stored album art, image slide shows, and product purchase information can be indexed with a Content ID so that it can be accessed multiple times. The rendering applications can be coded in software using any suitable programming language such as C, C++, or for example and implementing such applications is within the purview of one of ordinary skill in the art.

Additionally, different receivers will have different input, display, and memory capabilities. Some typical receiver's displays may include 4 line by 16 character LED or LCD displays, 2 line by 16 character LED or LCD displays, 256 color OEL displays, multi-line back lit LCD displays with 6" or larger multimedia displays, and portable radio back lit LCD displays. Generally the receivers with more advanced displays have more available memory. Simpler receivers may only have a small amount of RAM (e.g., less than 50 Kbytes) while more advanced receivers may have a larger amount of RAM (e.g., 100 Kbytes or more) as well as non-volatile memory such as Flash ROM (e.g., built-in Flash, a hard disk drive, and/or a SD® Memory Card). Advantageously, exemplary embodiments of the present disclosure provide adaptable rendering and storage based on the capabilities of the receiver.

The data content may be stored in any suitable memory structure. For example, a file system could be used such as NTFS or Journaling Flash File System version 2 (JFFS2). Alternatively, the files could be stored in a database such as SQLite or MySQL. Naturally, the memory structure utilized should be consistent with the memory capabilities of the receiver. Thus more capable receivers could have more complex memory structures. In some embodiments the data content may be stored in non-volatile memory. In these cases, the data content may be available immediately upon power-up without requiring the download of any new data content.

The way the data content is rendered may also depend on the receiver characteristics (e.g., display or memory capabilities) and/or according to user choice. For example, a simple embedded receiver may only receive and display simple text-based data content while a more capable receiver may display, for example, image slide shows, album art, and even video. Once the data content has been formatted for the display, it can then be rendered by the DCU 242, 298. In some embodiments filtering data content may be performed according to the end user's choice. Advantageously, the displayed data content may be reduced, for example, by preventing display of album art or closed captioning, upon the end user's selection and irrespective of the display's further capabilities.

Exemplary applications for synchronizing data content with audio content will now be described. The examples include an album art/image slide show/video application, a closed captioning application, a product purchase information application, and a scrolling text application. However, it should be understood that these examples are provided for illustrative purposes only and should not be considered to limit the scope of the disclosure or the claims.

An album art, an image slide show, and a video application would all typically operate in a similar manner. As described above with reference to FIGS. 11 and 12, the exporter 20 sends a request message to the importer 18 for a logical channel to generate a modem frame. Part of this request is the ALFN of the current modem frame. The importer 18 then makes a content request to the client application 700, which request includes the current ALFN and the time at which the audio transmitted in the modem frame is expected to be rendered by a digital radio broadcast receiver. In this case, the client application 700 may be, for example, an album art and/or an image slide show application that includes an image repository containing, for example, JPG or GIF images. The client application 700 also may be a video application including, for example, an H.264 video encoder, and a video repository containing, for example, MPEG-4 video clips. The client application 700 typically also has access to information related to the audio content.

The client application 700 schedules the transmission of the relevant image and/or video for transmission such that the image and/or video is available at the receiver prior to the anticipated rendering time of the related song. The nature of the scheduling algorithm is an implementation consideration that would be within the purview of one of ordinary skill in the art. Any suitable scheduling technique could be used that would allow the images/videos to arrive at the receiver in time for rendering with the associated audio. In certain embodiments, a sophisticated scheduler could allow the image and/or video to arrive at the receiver just in time for it to be rendered with the associated audio.

For example, a scheduling application could schedule rendering of one or more images/videos associated with a song or audio program (e.g., advertisement, sporting event, talk show, etc.) based on the start/end times of the song or audio program (or equivalently start time and song duration) and a duration percentage for displaying the images/video (i.e., how long each image is to be displayed with reference to the duration of the song or audio event). To obtain the song start/end times, the application could have access to a database that includes an audio service's play list, wherein the database includes songs associated with the time when each song will be input into the importer 18 or exporter 20 for broadcast. To obtain a duration percentage for each image/video, the image/video repository could include a display order and information describing a predetermined percentage of the associated song. The scheduler would determine the appropriate times for rendering the images/videos based on this information and include these times with the transmitted image/video using, for example, the content protocol described above with reference to FIG. 13.

Figure 15:
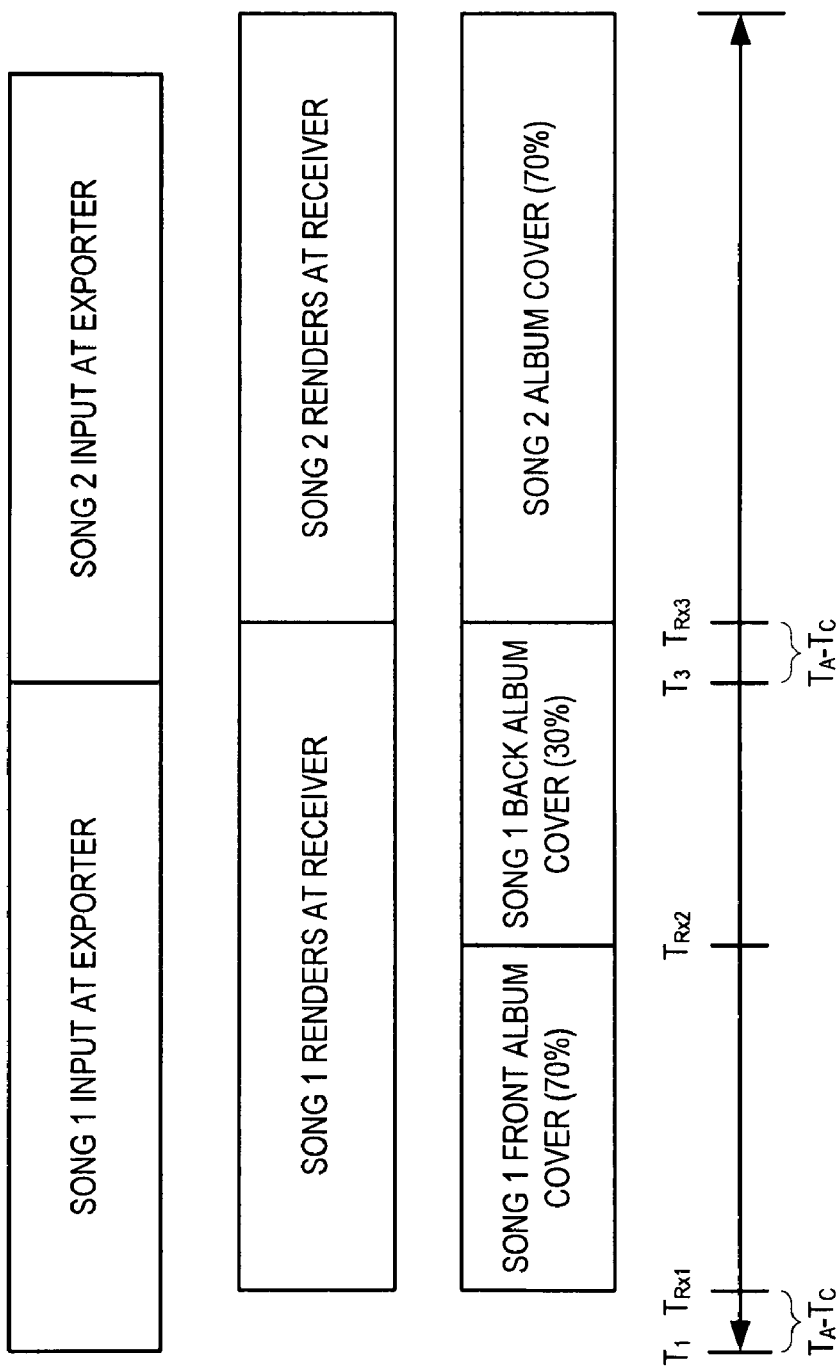
FIG. 15 illustrates an exemplary operation of an image rendering application in accordance with certain embodiments.

FIG. 15 illustrates an exemplary image scheduling application operation. In the example, two songs are scheduled to be played. An audio play list database indicates that Song 1 is scheduled to be sent to the exporter 20 at time $T_1$ and Song 2 is scheduled to be sent to the exporter 20 at time $T_3$. Song 1 has two associated album art images (e.g., a front album cover and a back album cover), while Song 2 has only one album art image. The front album cover of the album is supposed to display for the first 70% of Song 1 while the back album cover is supposed to display for the last 30%. Given $T_1$ and the difference between $T_C$ and $T_A$, the application determines the time, $T_{Rx1}$, at which Song 1 will begin being rendered by a receiver (i.e., $T_{Rx1}=T_1+(T_A-T_C)$), and the time $T_{Rx3}$ at which Song 2 will begin being rendered by a receiver (i.e., $T_{Rx3}=T_3+(T_A-T_C)$). The application then schedules rendering of the front album cover at $T_{Rx1}$ and the back album cover at time $T_{Rx3}$. Similarly, based on a duration percentage of 30%, the application determines the time $T_{Rx2}$ to begin displaying the back album cover. The times $T_{Rx1}$, $T_{Rx2}$, and $T_{Rx3}$ would then be transmitted with their respective album art images.

The images and/or videos are encoded using the content protocol described above with reference to FIG. 13. Specifically, the header core 760 would typically include timing instructions (e.g., StartALFN, EndALFN, duration, and/or block offset) that will cause the receiver to render the images/videos in synchronization with the audio. These timing instructions are adjusted by adding the difference between the $T_A$ and the $T_C$ to account for system latency, for example as described above with reference to FIG. 15. Additionally, the SIG record for the service would indicate that the receiver should use, for example, an album art or image slide show application, to render the data content by including MIME type identifiers such as application/x-hdradio-std/album-art (0x79a521f4) or application/x-hdradio-std/slide-show (0x065945d07). The client 700 sends the encoded images/videos to the importer 18. The importer 18 then sends them to the exporter 20 for digital radio broadcast transmission. It should be noted that images and videos will typically be encoded and transmitted using packet transmission (e.g., LOT) but they may also be transmitted using byte-streaming. However, one of skill in the art would appreciate that when images or videos are transmitted via byte-streaming, available broadcast bandwidth may limit the size of images/videos. For example, larger images and videos typically take longer to transmit assuming a fixed bandwidth availability. Therefore, assuming that the images/videos are transmitted so that they arrive just in time for rendering at the receiver, the bandwidth constraints may limit the use of byte-streaming to images or videos that can be broadcast within, for example, the duration of a song, so that the image/video is available for rendering at the beginning of the next song.

In operation, the receiver will receive and download the images and/or videos, which will typically include timing instructions in the header if the packet transmission mode is being used. The receiver then polls the ALFN, which is broadcast in the SIS. When the timing instructions indicate that the image or video should be displayed (e.g., the polled ALFN matches the StartALFN of the stored image), the image/video will be displayed by the display control unit in synchronization with the receiver rendering the audio via the audio speakers. In certain embodiments, if no images are available the receiver can display a default image.

A closed captioning application would provide text information that is synchronized with the audio. Examples of such an application can include radio for the hearing impaired or language translations. In this case, the client application 700 is a closed captioning application. For example, the client 700 could receive closed captioning input from a human operator, a software implemented speech-to-text translator, or a pre-stored text file containing the text of the speech that has associated rendering times for components of the speech. For a human operator, the client could present a word processing screen to the operator that presents the text that has been typed and indicating which text has already been transmitted. For example, the words that have been transmitted could be grayed out after they have been sent based on the content request messages received from the importer 18.

The text would be encoded using the content protocol described above with reference to FIG. 13. Specifically, the header core 760 would include SYNC bits that allow the receiver to reassemble the text packets as described above. The text packets can be delivered, for example, using a fixed time or a number of characters to delimit the packets. The header extension 762 may also include information indicating that the text should be rendered by the receiver as soon as it is received. However, in certain embodiments the header core 760 can include timing instructions (e.g., StartALFN, EndALFN, duration, and/or block offset) that will cause the receiver to render the text in synchronization with the audio. These timing instructions are adjusted based on $T_A$, $T_D$, and $T_C$ to account for system latency. Additionally, the header core 760 would indicate that the receiver should use a text rendering application to render the data content by including MIME type identifiers such as application/x-hdradio-std/closed-caption (0x08c805636).

Typically, the client 700 sends the text packets to the importer 18 so that they arrive at the receiver just in time to be rendered in synchronization with the associated audio. Accordingly, this application would typically use byte-streaming to minimize delivery jitter. Additionally, in certain embodiments the I2E link delay may be reduced to minimize latency. In certain embodiments, the text packets can be buffered by the client 700 to account for system latency. For example, the client 700 can use $T_A$, $T_D$, and $T_C$ to determine how much to buffer the text packets so that the text is rendered in synchronization with the audio. In certain embodiments, the client 700 can also use $T_A$, $T_D$, and $T_C$ to buffer the audio by providing an input to the audio encoder, such that there is sufficient time for the text to be generated and delivered to the importer 18.

In operation, the receiver may receive and immediately render the text characters. Alternatively, the text can be rendered in synchronization with the audio based on timing instructions as described above. The display can be updated periodically as text is received (e.g., reset or lines of text scrolled up or down in a text box). For example, the receiver could establish an average number of words per minute or characters per second so that the words would be rendered smoothly to mitigate the burstiness of delivery. Additionally, the display could be updated upon receipt of a new content packet, after a predetermined amount of time, or when the text box on the display is full.

Figure 16A:
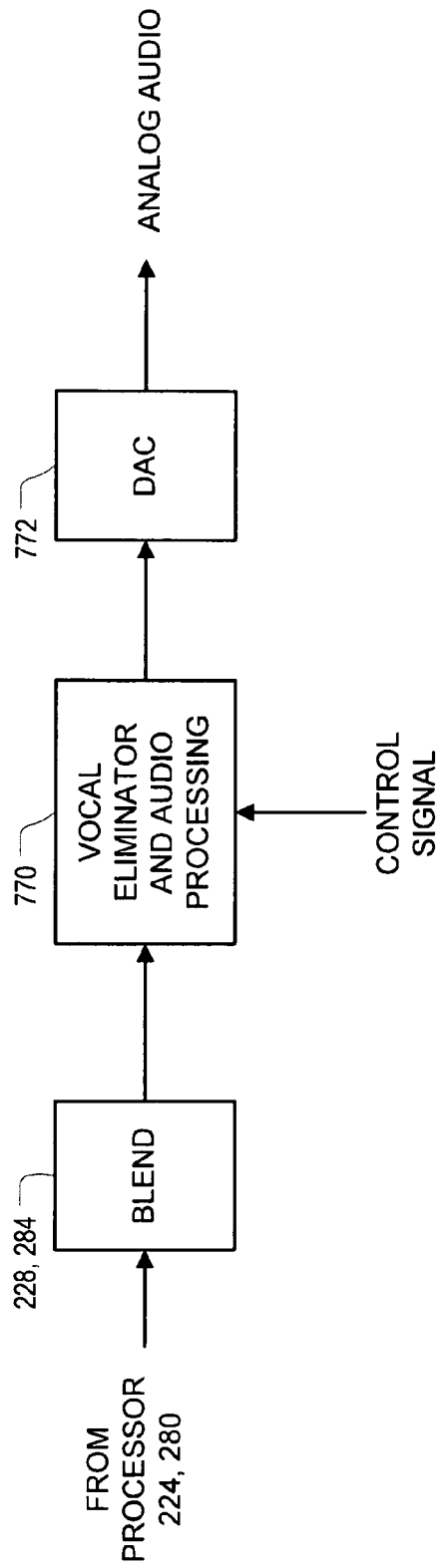
FIGS. 16a and 16b illustrate an exemplary digital radio receiver vocal reducing and/or eliminating capability for radio karaoke in accordance with certain embodiments.
Figure 16B:
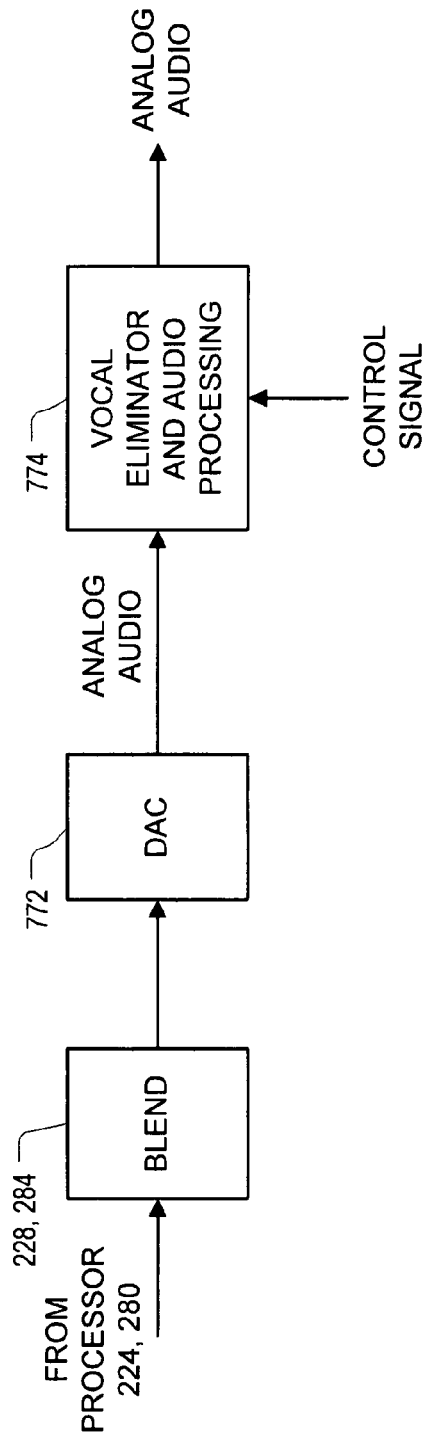

A radio karaoke application would also provide highly synchronized text with the audio and would operate very similarly to the exemplary closed captioning application described above. However, in certain embodiments a radio karaoke implementation may also include a receiver capability for reducing and/or eliminating the vocals from an audio track in real time. This may be desirable to improve the karaoke experience for users. FIGS. 16*a* and 16*b* illustrate exemplary components for receiver components in accordance with certain embodiments. FIG. 16*a* illustrates an exemplary digital technique for reducing and/or eliminating the vocal components of an audio track. With reference to FIGS. 7 and 8, the processor 224, 280 and blocks 230, 284 of an exemplary digital radio broadcast receiver are shown. The audio signal from blocks 230, 284 enters the vocal eliminator and audio processing block 770 where it is processed. The vocal eliminator and audio processing block 770 can be implemented, for example, in the baseband processor 201, 251 or in a separate processing system that includes software, hardware, or any suitable combination thereof; and performs digital signal processing operations on the audio sufficient to substantially filter out the vocal component.

Any suitable vocal elimination algorithm could be used as would be known to one of skill in the art. For example, assuming that the vocals are encoded on a center channel an exemplary algorithm might be as follows. The processing system could transform the left and right channels of the audio signal to the frequency domain using, for example, the Fast Fourier Transform (FFT) or Fast Hartley Transform (FHT). Then, for each frequency component, where L is the 2D vector from the left channel, and R is the 2D vector from the right channel, the processing system would compute the center component $C=L/|L|+R/|R|$ and then compute a such that $(L-\alpha C)\cdot(R-\alpha C)=0$. Essentially, the processing system would scale C so that when it is subtracted from L and R, the two resultant vectors are perpendicular. Expanding this gives the equation $(C\cdot C)\alpha^2 - C\cdot(L+R)\alpha + (L\cdot R)=0$, which the processing system may solve for $\alpha$, for example, by the quadratic formula. Then, it would compute $C'=\alpha C$, $L'=L-\alpha C$, and $R'=R-\alpha C$. Finally, it would transform L', R', and C' back to time domain using an inverse FFT or FHT, overlap and add the signal components back together. While this exemplary algorithm may result in an undesirable removal of low frequency components, a low pass filter could also be used to extract and then reinsert these low frequency components after the center component has been removed.

The vocal eliminator and audio processing block 770 also includes a control signal input that may, among other functions, activate and deactivate the vocal eliminator operation. This control signal may be generated by the host controller 240, 296 according to a user's input. For example, if a user is using a radio karaoke application, the user may be presented with an icon or menu selection that allows them to choose to eliminate the vocals (e.g., a "VOCAL ELIMINATOR" button). After processing the audio signal is then output to a digital-to-analog converter 772 (DAC), which converts the digital signal to an analog audio output suitable for rendering by, for example, analog speakers.

FIG. 16b illustrates an exemplary analog technique for reducing and/or eliminating the vocal components of an audio track. The analog technique is similar to the digital technique except that the vocal eliminator and audio processing block 774 is implemented after the DAC 772 and typically would use electronic components such as, for example, a differential amplifier for reducing the vocals and a low pass filter for maintaining the low frequency components.

In certain embodiments, the receiver may also provide the capability for recording and storing a user's karaoke performance. For example, in a receiver including a microphone input and sufficient data storage (e.g., a hard disk drive, flash ROM, and/or removable memory storage such as an SD card), a karaoke application at the receiver could allow a user to activate a recording function. Once the recording function is activated, the user's vocals and the audio track, with or without the vocals filtered, could be mixed and stored in memory. The mixed audio could be stored, for example, in HDC compressed format and could be replayed at a later time. Exemplary storing and replaying functions in digital radio broadcast receivers are disclosed in U.S. patent application Ser. No. 11/644,083 (U.S. Patent Pub. No. 2008/0152039), which is incorporated by reference herein in its entirety.

A product purchase information application could send ID3 based (UFID) product codes that are associated with songs that will be rendered before the actual content is broadcast. This application would be very similar to the album art and image slide show applications described above but there are a few differences. First, the type and size of the content is different (i.e. ID3 tags instead of images). Therefore, since ID3 tags are not very large, each product code can be broadcast in a single content protocol packet and thus they may more readily be sent using byte-streaming. Also, the SIG record for the service would indicate that the receiver should use a product purchase information application to render the data content by including MIME type identifiers such as application/x-hdradio-std/product-info (0x1343c25). Further, the client 700 would use the rendering start and stop times as validity times to match the product purchase information with the specific content being rendered. On the receiver side, once the user of the receiver inputs instructions to purchase a product associated with the current media content (e.g., presses a tagging button), the application can poll the current ALFN from the SIS and match this ALFN to the proper product information. This product purchase information can then be transmitted to a content provider to consummate a sale. A detailed example of tagging for digital radio broadcast receivers can be found in U.S. Patent App. Pub. No. 2009/0061763, which is incorporated by reference herein in its entirety. Client applications for sending PSD information (typically ID3 tags) associated with the audio could operate in a similar manner.

Finally, a scrolling text application is an informational text application wherein the text is not as tightly coupled to the audio as in the closed captioning application. Examples of scrolling text applications can include stock quotes, traffic advisories, etc. The operation of a scrolling text application is almost identical to that of a closed captioning application. However, timing instructions need not be provided and the level of synchronization between the audio and the text packets need not be very high. For example, there would be little need to buffer the audio to account for text generation time or to reduce the I2E link delay time. Also, the header core 760 would indicate that the receiver should use a scrolling text application to render the data content by including MIME type identifiers such as application/x-hdradio-std/scrolling-text (0x97f54d9b). Also, the content packet header extension 762 may be sent with a duration indicator so that the receiver can determine a proper scrolling rate. In certain embodiments, if no new text packets are available at the receiver, then the receiver will scroll the last text packet until a new one is received.

Figure 17A:
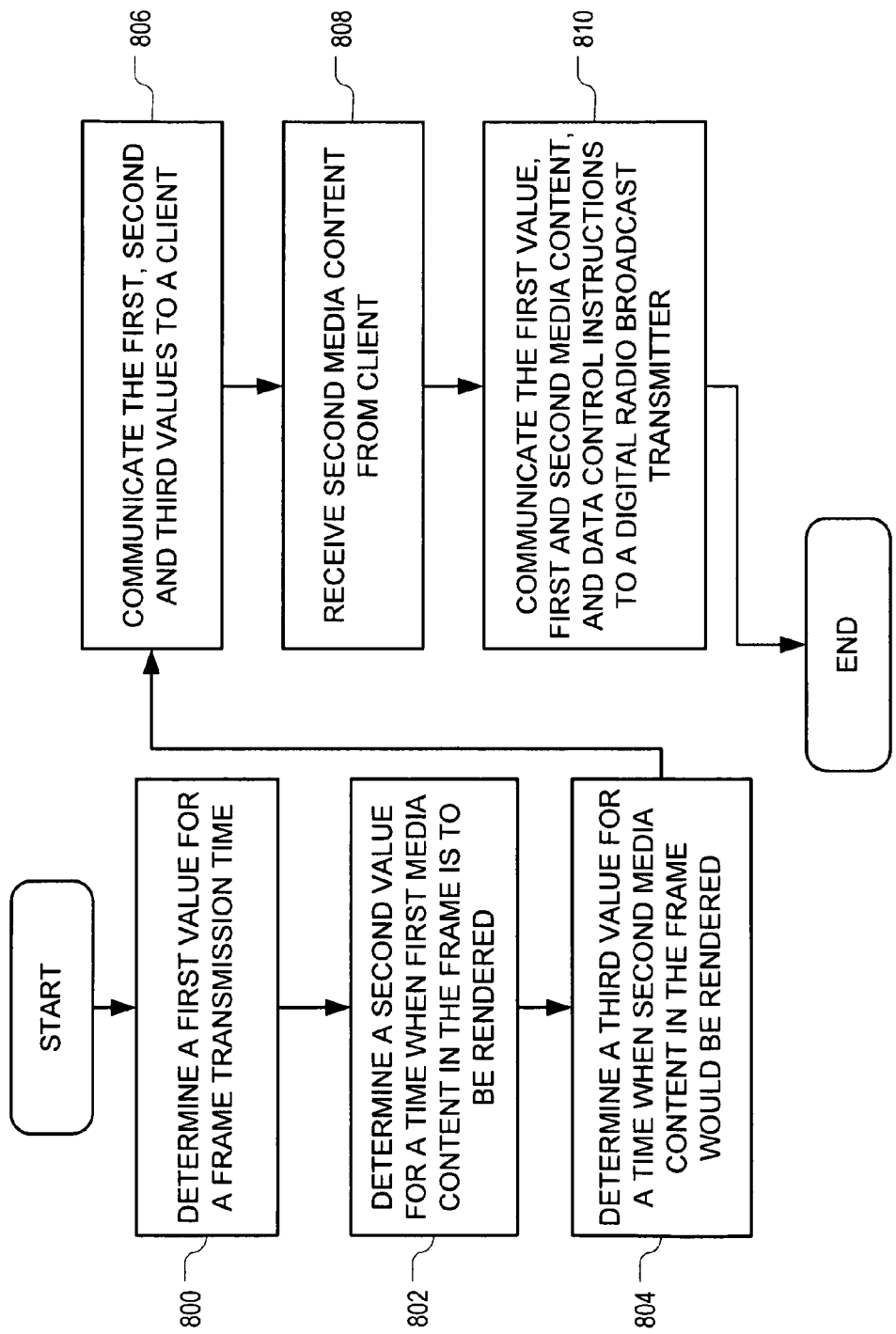
FIG. 17a illustrates an exemplary process of generating synchronized media content in a digital radio broadcast transmitter system for digital radio broadcast in accordance with certain embodiments.

FIG. 17a illustrates an exemplary process of encoding and transmitting a first media content (e.g., audio) and a second media content (e.g., data content) in a digital radio broadcast system comprising a processing system, such that the second media content can be rendered in synchronization with the first media content by a digital radio broadcast receiver. In step 800, the importer 18 determines a first value ($T_C$) corresponding to a time at which a frame is to be transmitted by a digital radio broadcast transmitter.

In step 802, the importer 18 determines a second value ($T_A$) corresponding to a time at which a first media content transmitted in the frame is to be rendered by a digital radio broadcast receiver based on a first latency, wherein the first media content is processed through a first signal path through the digital radio broadcast transmitter and the digital radio broadcast receiver thereby incurring a first latency that is based on an estimated time for processing the first media content through the first signal path. For example, referring to FIG. 11, main audio is output from the main audio source 714 to the audio encoder 716 in the exporter 20 and then to multiplexer 712. In contrast, secondary audio is output from the secondary audio source 702 to the audio encoder 706, then through multiplexer 708 and finally to the exporter multiplexer 712 via I2E interface 710. Accordingly, it should be clear from this example that main audio and secondary audio would typically incur different latencies through the transmitter side.

In step 804, the importer determines a third value ($T_D$) corresponding to a time at which a second media content in the frame would be rendered by the digital radio broadcast receiver based on a second latency, wherein the second media content is processed through a second signal path through the digital radio broadcast transmitter and the digital radio broadcast receiver thereby incurring the second latency that is based on an estimated time for processing the first media content through the first signal path. This second latency is typically different than the first latency. For example, referring again to FIG. 11, data content is output from the client 700 to the RLS encoder 704, then through multiplexer 708 and finally to the exporter multiplexer 712 via I2E interface 710. Thus it should be apparent that the latency of data content will typically be different than the latency of audio through the transmitter side.

In step 806, the importer 18 communicates the first, second, and third values to a client application 700 via an API. The client application 700 may be, for example, a closed captioning application, a karaoke radio application, a scrolling text application, album art, or a product purchase information application. The client application 700 then processes the second media content at a time determined by the client based on the first, second, and third values, thereby controlling the timing at which second media content is to be transmitted, so as to synchronize the timing of rendering the second media content at a digital radio broadcast receiver relative to the timing of rendering the first media content at the digital radio broadcast receiver. In step 808, the importer 18 receives second media content for the frame from the client 700. Finally, in step 810 the importer 18 communicates the second media content to the exporter 20, which in turn generates the frame and communicates the frame to a digital radio broadcast transmitter site via STL link 14. The generated frame includes the first value, first media content, second media content, and data control instructions associating the second media content with the first media content (e.g., SIG).

In certain embodiments, the first latency and the second latency are transmission-location dependent meaning that the latencies can vary from radio station to radio station and from one service to another. In certain embodiments, the digital radio broadcast receiver renders the first media content and second media content without making determinations about the relative rendering timing for the second media content and the first media content. In certain embodiments, the frame does not include an independent clock signal for synchronizing the first and second media content.

Figure 17B:
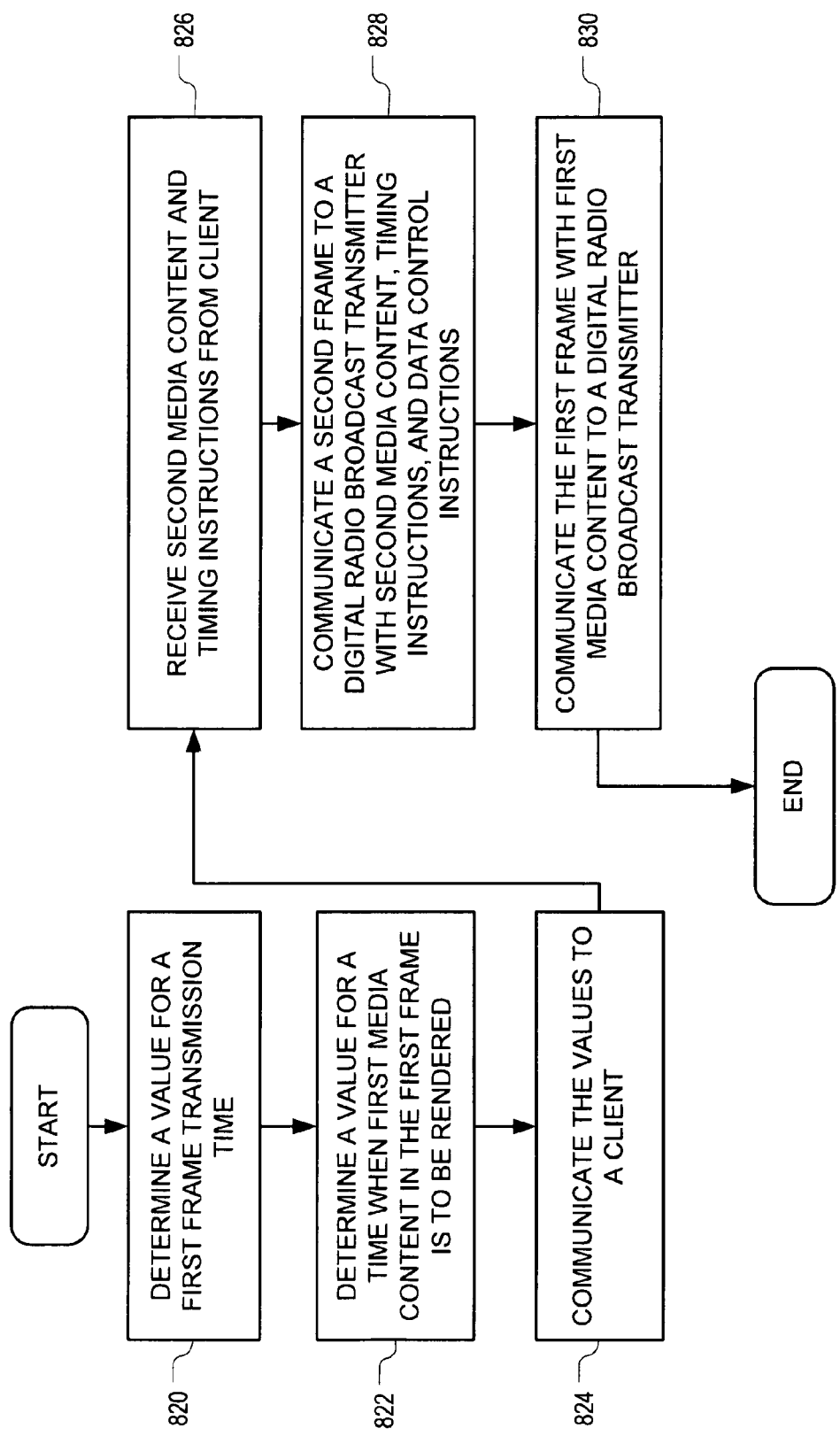
FIG. 17b illustrates an exemplary process of generating synchronized media content in a digital radio broadcast transmitter system for digital radio broadcast in accordance with certain embodiments.

FIG. 17b illustrates an exemplary process of encoding and transmitting a first media content and a second media content in a digital radio broadcast system comprising a processing system, such that the second media content can be rendered in synchronization with the first media content by a digital radio broadcast receiver. In step 820, the importer 18 determines a first value ($T_C$) corresponding to a time at which a frame is to be transmitted by a digital radio broadcast transmitter. In step 822, the importer 18 determines a second value ($T_A$) corresponding to a time at which a first media content transmitted in the frame is to be rendered by a digital radio broadcast receiver based on a first latency, wherein the first media content is processed through a first signal path through the digital radio broadcast transmitter and the digital radio broadcast receiver thereby incurring the first latency. In step 824 the importer 18 communicates the first and second values to a client application 700 via an API. The client application 700 may be, for example, a closed captioning application, a karaoke radio application, a scrolling text application, a product purchase information application, an album art application, or an image slide show application.

The client application 700 then processes the second media content based on the first and second values to generate timing instructions that are included in a content protocol packet. The timing instructions are provided so as to synchronize the timing of rendering the second media content at a digital radio broadcast receiver relative to the timing of rendering the first media content at the digital radio broadcast receiver. In step 826, the importer 18 receives from the client 700 second media content and the timing instructions for the digital radio broadcast receiver to render the second media content at a predetermined time in synchronization with the first media content based on the first and second values. In step 828 the importer 18 communicates the second media content to the exporter 20, which in turn generates a frame and communicates the frame to a digital radio broadcast transmitter site via STL link 14. The generated frame includes the first value, second media content, timing instructions (e.g., in the content protocol packet attached to the second media content), and data control instructions associating the second media content with the first media content (e.g., SIG). This first frame is broadcast in sufficient time so that the second media content is available for rendering at the receiver in time for it to be rendered in synchronization with the first media content when it arrives. Finally, in step 830 the importer 18 communicates the first media content to the exporter 20, which in turn generates a second frame and communicates the frame to a digital radio broadcast transmitter site via STL link 14. The generated frame includes the first media content.

Figure 18:
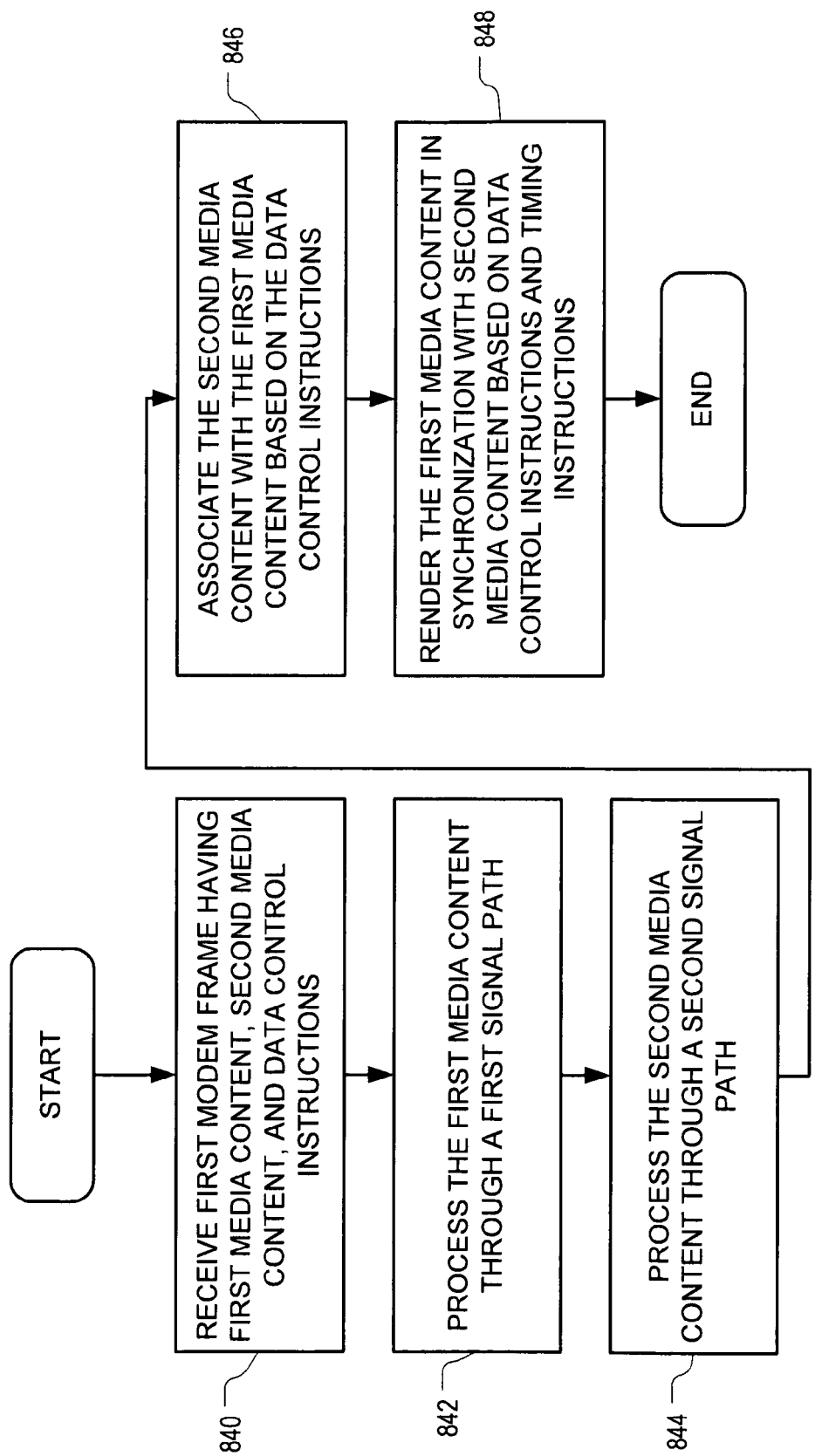
FIG. 18 illustrates an exemplary process of receiving and rendering synchronized media content in a digital radio broadcast receiver in accordance with certain embodiments.

FIG. 18 illustrates an exemplary process of receiving and rendering a first media content in synchronization with a second media content in a digital radio broadcast receiver. In step 840, the baseband processor 201, 251 receives a frame having first media content (e.g., audio), second media content (e.g., data content), and data control instructions (e.g., SIG) associating the second media content with the first media content, wherein the second media content has been composed for rendering in synchronization with the first media content based on an estimated latency through the digital radio broadcast transmitter and the digital radio broadcast receiver as discussed above.

In step 842 the baseband processor 201, 251 processes the first media content through a first signal path in the digital radio broadcast receiver, thereby incurring a first latency. For example, as described above with reference to FIG. 7, a digital demodulator 216 demodulates the digitally modulated portion of an incoming baseband signal. The digital signal is then deinterleaved by a deinterleaver 218, and decoded by a Viterbi decoder 220. A service demultiplexer 222 separates main and supplemental program signals from data signals. A processor 224 processes the program signals to produce a digital audio signal on line 226. In step 844 the baseband processor 201, 251 also processes the second media content through a second signal path in the digital radio broadcast receiver, thereby incurring a second latency that is different than the first latency. For example, referring to FIG. 7, data content is processed as described above until the digital signal reaches the service demultiplexer 222. The service demultiplexer 222 outputs data signals to a data processor 232, which processes the data signals and produces data output signals on lines 234, 236 and 238. The data processor 232 then sends the data output signals (e.g., the second media content) to the host controller 240 responsive to a polling request. Since the audio and the data content are processed through different signal paths in the receiver, the latencies of the audio and data content are typically different through the digital radio broadcast receiver. Specifically, with reference to the above example the audio is processed by processor 224 and the data content is processed by data processor 232 and then by the host controller 240, 296.

In step 846 the host controller 240, 296 then associates the second media content with the first media content based on the data control instructions. For example, a SIG audio service record may include subservice information descriptors that the host controller 240, 296 uses to associate the audio with data content. In step 848, the host controller 240, 296 renders the second media content in synchronization with the first media content based on the data control service instructions, wherein the digital radio broadcast receiver renders the first media content and second media content without making determinations about the relative rendering timing for the second media content and the first media content. In certain embodiments, the frame does not include an independent clock signal for synchronizing the first and second media content. The second media content may include, for example, closed captioning information, song lyrics, album art, image slide shows, product purchase information, or scrolling text. In certain embodiments the second media content can be radio karaoke information (e.g., song lyrics) and the receiver can filter vocal components of the audio in real time so as to reduce the vocal component as described above with reference to FIGS. 16a and 16b.

The previously described embodiments of the present disclosure have many advantages, including:

One advantage is that in certain embodiments, audio and data content can be rendered in synchronization at the receiver without transmitting an independent clock reference to the receiver that could be referenced for both audio and data rendering. Thus there are no significant modifications to the baseband processor required. Additionally, including an additional clock signal would require additional bandwidth, which is at a premium in digital radio broadcast systems.

Another advantage is that in certain embodiments, audio and data content can be rendered in synchronization at the receiver without referencing the rendering of data content to the playback of the audio. Thus no significant changes to the baseband processor would be required.

The exemplary approaches described may be carried out using any suitable combinations of software, firmware and hardware and are not limited to any particular combinations of such. Computer program instructions for implementing the exemplary approaches described herein may be embodied on a computer-readable storage medium, such as a magnetic disk or other magnetic memory, an optical disk (e.g., DVD) or other optical memory, RAM, ROM, or any other suitable memory such as Flash memory, memory cards, etc. Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A digital radio broadcast transmitter system configured to encode and transmit first media content and second media content, such that the second media content can be rendered in synchronization with the first media content by a digital radio broadcast receiver, comprising:
   a processing system; and
   a memory coupled to the processing system, wherein the processing system is configured to execute steps comprising:
   determining at the processing system a first value corresponding to a time at which a frame is to be transmitted by a digital radio broadcast transmitter;
   determining at the processing system a second value corresponding to a time at which first media content transmitted in the frame is to be rendered by a digital radio broadcast receiver based on a first latency, wherein the first latency is based on an estimated time for processing the first media content via a first signal path through the digital radio broadcast transmitter and the digital radio broadcast receiver;
   determining at the processing system a third value corresponding to a time at which second media content in the frame would be rendered by the digital radio broadcast receiver based on a second latency, wherein the second latency is based on an estimated time for processing the second media content via a second signal path through the digital radio broadcast transmitter and the digital radio broadcast receiver, and wherein the second latency is different than the first latency;
   processing the second media content at the processing system based on the first, second, and third values to determine a time at which second media content is to be transmitted to the digital radio broadcast receiver, so as to synchronize the timing of rendering the second media content at a digital radio broadcast receiver relative to the timing of rendering the first media content at the digital radio broadcast receiver; and
   communicating to the digital radio broadcast transmitter, the first value, first media content, second media content, and data control instructions associating the second media content with the first media content.

2. The digital radio broadcast transmitter system of claim 1 wherein the first latency and the second latency depend upon a geographic location of the digital radio broadcast transmitter.

3. The digital radio broadcast transmitter system of claim 1 comprising rendering the first media content and second media content at the digital radio broadcast receiver without the digital radio broadcast receiver making determinations about the relative timing for rendering the second media content and the first media content.

4. The digital radio broadcast transmitter system of claim 1 wherein the frame does not include an independent clock signal for synchronizing the first and second media content.

5. The digital radio broadcast transmitter system of claim 1 wherein the first media content is audio content.

6. The digital radio broadcast transmitter system of claim 1 wherein the second media content comprises closed captioning information.

7. The digital radio broadcast transmitter system of claim 1 wherein the second media content comprises images.

8. The digital radio broadcast transmitter system of claim 1 wherein the second media content comprises product purchase information configured to associate a current media content being rendered with a product to be purchased corresponding to the second media content, such that a user of the digital radio broadcast receiver can input instructions to purchase a product associated with the current media content.

9. A digital radio broadcast transmitter system configured to encode and transmit first media content and second media content, such that the second media content can be rendered in synchronization with the first media content by a digital radio broadcast receiver, comprising:

a processing system; and a memory coupled to the processing system, wherein the processing system is configured to execute steps comprising:

determining at the processing system a first value corresponding to a time at which a frame is to be transmitted by a digital radio broadcast transmitter;

determining at the processing system a second value corresponding to a time at which first media content transmitted in the frame is to be rendered by a digital radio broadcast receiver based on a first latency, wherein the first latency is based on an estimated time for processing the first media content via a first signal path through the digital radio broadcast transmitter and the digital radio broadcast receiver;

determining at the processing system a third value corresponding to a time at which second media content in the frame would be rendered by the digital radio broadcast receiver based on a second latency, wherein the second latency is based on an estimated time for processing the second media content via a second signal path through the digital radio broadcast transmitter and the digital radio broadcast receiver, and wherein the second latency is different than the first latency;

communicating the first, second, and third values to a client;

receiving second media content for the frame from the client at a time determined by the client based on the first, second, and third values, thereby controlling the timing at which second media content is to be transmitted by the digital radio broadcast transmitter, so as to synchronize the timing of rendering the second media content at a digital radio broadcast receiver relative to the timing of rendering the first media content at the digital radio broadcast receiver; and communicating to the digital radio broadcast transmitter the first value, first media content, second media content, and data control instructions associating the second media content with the first media content.

10. The digital radio broadcast transmitter system of claim 9 wherein the first latency and the second latency depend upon a geographic location of the digital radio broadcast transmitter.

11. The digital radio broadcast transmitter system of claim 9 comprising rendering the first media content and second media content at the digital radio broadcast receiver without the digital radio broadcast receiver making determinations about the relative timing for rendering the second media content and the first media content.

12. The digital radio broadcast transmitter system of claim 9 wherein the frame does not include an independent clock signal for synchronizing the first and second media content.

13. The digital radio broadcast transmitter system of claim 9 wherein the first media content is audio content.

14. The digital radio broadcast transmitter system of claim 9 wherein the second media content comprises closed captioning information.

15. The digital radio broadcast transmitter system of claim 9 wherein the second media content comprises images.

16. The digital radio broadcast transmitter system of claim 9 wherein the second media content comprises product purchase information configured to associate a current media content being rendered with a product to be purchased corresponding to the second media content, such that a user of the digital radio broadcast receiver can input instructions to purchase a product associated with the current media content.

17. A digital radio broadcast transmitter system configured to encode and transmit first media content and second media content, such that the second media content can be rendered in synchronization with the first media content by a digital radio broadcast receiver, comprising:

a processing system; and a memory coupled to the processing system, wherein the processing system is configured to execute steps comprising:

determining at the processing system a first value corresponding to a time at which a first frame is to be transmitted by a digital radio broadcast transmitter;

determining at the processing system a second value corresponding to a time at which first media content transmitted in the first frame is to be rendered by a digital radio broadcast receiver;

communicating the first and second values to a client;

receiving from the client second media content and timing instructions for the digital radio broadcast receiver to render the second media content at a predetermined time in synchronization with the first media content based on the first and second values;

communicating a second frame to the digital radio broadcast transmitter, wherein the second frame includes the second media content, the timing instructions, and data control instructions associating the first media content with the second media content; and communicating the first frame including the first media content and the first value to the digital radio broadcast transmitter such that the first media content and the second media content are rendered in synchronization by the digital radio broadcast receiver.

18. The digital radio broadcast transmitter system of claim 17 wherein the first frame and the second frame do not include an independent clock signal for synchronizing the first and second media content.

19. The digital radio broadcast transmitter system of claim 17 wherein the first media content is audio content.

20. The digital radio broadcast transmitter system of claim 17 wherein the second media content comprises images.

21. The digital radio broadcast transmitter system of claim 17 wherein the second media content comprises closed captioning information.

22. The digital radio broadcast transmitter system of claim 17 wherein the second media content comprises product purchase information configured to associate a current media content being rendered with a product to be purchased corresponding to the second media content, such that a user of the digital radio broadcast receiver can input instructions to purchase a product associated with the current media content.

23. A computer-implemented method of encoding and transmitting first media content and second media content using a digital radio broadcast system comprising a processing system, such that the second media content can be rendered in synchronization with the first media content by a digital radio broadcast receiver, the method comprising:

determining at the processing system a first value corresponding to a time at which a frame is to be transmitted by a digital radio broadcast transmitter;

determining at the processing system a second value corresponding to a time at which first media content transmitted in the frame is to be rendered by a digital radio broadcast receiver based on a first latency, wherein the first latency is based on an estimated time for processing the first media content via a first signal path through the digital radio broadcast transmitter and the digital radio broadcast receiver;

determining at the processing system a third value corresponding to a time at which second media content in the frame would be rendered by the digital radio broadcast receiver based on a second latency, wherein the second latency is based on an estimated time for processing the second media content via a second signal path through the digital radio broadcast transmitter and the digital radio broadcast receiver, and wherein the second latency is different than the first latency;

processing the second media content at the processing system based on the first, second, and third values to determine a time at which second media content is to be transmitted to the digital radio broadcast receiver, so as to synchronize the timing of rendering the second media content at a digital radio broadcast receiver relative to the timing of rendering the first media content at the digital radio broadcast receiver; and communicating to the digital radio broadcast transmitter, the first value, first media content, second media content, and data control instructions associating the second media content with the first media content.

24. An article of manufacture comprising a non-transitory computer readable storage medium having computer program instructions adapted to cause a processing system to execute the steps of claim 23.

25. A computer-implemented method of encoding and transmitting first media content and second media content using a digital radio broadcast system comprising a processing system, such that the second media content can be rendered in synchronization with the first media content by a digital radio broadcast receiver, the method comprising:

determining at the processing system a first value corresponding to a time at which a frame is to be transmitted by a digital radio broadcast transmitter;

determining at the processing system a second value corresponding to a time at which first media content transmitted in the frame is to be rendered by a digital radio broadcast receiver based on a first latency, wherein the first latency is based on an estimated time for processing the first media content via a first signal path through the digital radio broadcast transmitter and the digital radio broadcast receiver;

determining at the processing system a third value corresponding to a time at which second media content in the frame would be rendered by the digital radio broadcast receiver based on a second latency, wherein the second latency is based on an estimated time for processing the second media content via a second signal path through the digital radio broadcast transmitter and the digital radio broadcast receiver, and wherein the second latency is different than the first latency;

communicating the first, second, and third values to a client;

receiving second media content for the frame from the client at a time determined by the client based on the first, second, and third values, thereby controlling the timing at which second media content is to be transmitted by the digital radio broadcast transmitter, so as to synchronize the timing of rendering the second media content at a digital radio broadcast receiver relative to the timing of rendering the first media content at the digital radio broadcast receiver; and communicating to the digital radio broadcast transmitter the first value, first media content, second media content, and data control instructions associating the second media content with the first media content.

26. An article of manufacture comprising a non-transitory computer readable storage medium having computer program instructions adapted to cause a processing system to execute the steps of claim 25.

27. A computer-implemented method of encoding and transmitting first media content and second media content using a digital radio broadcast system comprising a processing system, such that the second media content can be rendered in synchronization with the first media content by a digital radio broadcast receiver, the method comprising:

determining at the processing system a first value corresponding to a time at which a first frame is to be transmitted by a digital radio broadcast transmitter;

determining at the processing system a second value corresponding to a time at which first media content transmitted in the first frame is to be rendered by a digital radio broadcast receiver;

communicating the first and second values to a client;

receiving from the client second media content and timing instructions for the digital radio broadcast receiver to render the second media content at a predetermined time in synchronization with the first media content based on the first and second values;

communicating a second frame to the digital radio broadcast transmitter, wherein the second frame includes the second media content, the timing instructions, and data control instructions associating the first media content with the second media content; and communicating the first frame including the first media content and the first value to the digital radio broadcast transmitter such that the first media content and the second media content are rendered in synchronization by the digital radio broadcast receiver.

28. An article of manufacture comprising a non-transitory computer readable storage medium having computer program instructions adapted to cause a processing system to execute the steps of claim 27.

29. The method of claim 23 wherein the first latency and the second latency depend upon a geographic location of the digital radio broadcast transmitter.

30. The method of claim 23 comprising rendering the first media content and second media content at the digital radio broadcast receiver without the digital radio broadcast receiver making determinations about the relative timing for rendering the second media content and the first media content.

31. The method of claim 23 wherein the frame does not include an independent clock signal for synchronizing the first and second media content.

32. The method of claim 23 wherein the first media content is audio content,

33. The method of claim 23 wherein the second media content comprises closed captioning information.

34. The method of claim 23 wherein the second media content comprises images.

35. The method of claim 23 wherein the second media content comprises product purchase information configured to associate a current media content being rendered with a product to be purchased corresponding to the second media content, such that a user of a digital radio broadcast receiver can input instructions to purchase a product associated with the current media content.

36. The method of claim 25 wherein the first latency and the second latency depend upon a geographic location of the digital radio broadcast transmitter.

37. The method of claim 25 comprising rendering the first media content and second media content at the digital radio broadcast receiver without the digital radio broadcast receiver making determinations about the relative timing for rendering the second media content and the first media content.

38. The method of claim 25 wherein the frame does not include an independent clock signal for synchronizing the first and second media content.

39. The method of claim 25 wherein the first media content is audio content.

40. The method of claim 25 wherein the second media content comprises closed captioning information.

41. The method of claim 25 wherein the second media content comprises images.

42. The method of claim 25 wherein the second media content comprises product purchase information, and wherein the digital radio broadcast receiver is configured to associate a current media content being rendered with a product to be purchased corresponding to the second media content, such that a user of the digital radio broadcast receiver can input instructions to purchase a product associated with the current media content.

43. The method of claim 27 wherein the first frame and the second frame do not include an independent clock signal for synchronizing the first and second media content.

44. The method of claim 27 wherein the first media content is audio content.

45. The method of claim 27 wherein the second media content comprises images.

46. The method of claim 27 wherein the second media content comprises closed captioning information.

47. The method of claim 27 wherein the second media content comprises product purchase information configured to associate a current media content being rendered with a product to be purchased corresponding to the second media content, such that a user of the digital radio broadcast receiver can input instructions to purchase a product associated with the current media content.

48. The non-transitory computer readable storage medium of claim 24 wherein the first latency and the second latency depend upon a geographic location of the digital radio broadcast transmitter.

49. The non-transitory computer readable storage medium of claim 24 comprising rendering the first media content and second media content at the digital radio broadcast receiver without the digital radio broadcast receiver making determinations about the relative timing for rendering the second media content and the first media content.

50. The non-transitory computer readable storage medium of claim 24 wherein the frame does not include an independent clock signal for synchronizing the first and second media content.

51. The non-transitory computer readable storage medium of claim 24 wherein the first media content is audio content.

52. The non-transitory computer readable storage medium of claim 24 wherein the second media content comprises closed captioning information.

53. The non-transitory computer readable storage medium of claim 24 wherein the second media content comprises images.

54. The non-transitory computer readable storage medium of claim 24 wherein the second media content comprises product purchase information configured to associate a current media content being rendered with a product to be purchased corresponding to the second media content, such that a user of a digital radio broadcast receiver can input instructions to purchase a product associated with the current media content.

55. The non-transitory computer readable storage medium of claim 26 wherein the first latency and the second latency depend upon a geographic location of the digital radio broadcast transmitter.

56. The non-transitory computer readable storage medium of claim 26 comprising rendering the first media content and second media content at the digital radio broadcast receiver without the digital radio broadcast receiver making determinations about the relative timing for rendering the second media content and the first media content.

57. The non-transitory computer readable storage medium of claim 26 wherein the frame does not include an independent clock signal for synchronizing the first and second media content.

58. The non-transitory computer readable storage medium of claim 26 wherein the first media content is audio content.

59. The non-transitory computer readable storage medium of claim 26 wherein the second media content comprises closed captioning information.

60. The non-transitory computer readable storage medium of claim 26 wherein the second media content comprises images.

61. The non-transitory computer readable storage medium of claim 26 wherein the second media content comprises product purchase information, and wherein the digital radio broadcast receiver is configured to associate a current media content being rendered with a product to be purchased corresponding to the second media content, such that a user of the digital radio broadcast receiver can input instructions to purchase a product associated with the current media content.

62. The non-transitory computer readable storage medium of claim 28 wherein the first frame and the second frame do not include an independent clock signal for synchronizing the first and second media content.

63. The non-transitory computer readable storage medium of claim 28 wherein the first media content is audio content.

64. The non-transitory computer readable storage medium of claim 28 wherein the second media content comprises images.

65. The non-transitory computer readable storage medium of claim 28 wherein the second media content comprises closed captioning information.

66. The non-transitory computer readable storage medium of claim 28 wherein the second media content comprises product purchase information configured to associate a current media content being rendered with a product to be purchased corresponding to the second media content, such that a user of the digital radio broadcast receiver can input instructions to purchase a product associated with the current media content.

\* \* \* \* \*